US012608663B2

(12) United States Patent
Ding

(10) Patent No.: US 12,608,663 B2
(45) Date of Patent: Apr. 21, 2026

(54) GENERATING AND PROVIDING TEAM MEMBER RECOMMENDATIONS FOR CONTENT COLLABORATION

(71) Applicant: Dropbox, Inc., San Francisco, CA (US)

(72) Inventor: Jiarui Ding, San Jose, CA (US)

(73) Assignee: Dropbox, Inc., San Francisco, CA (US)

( * ) Notice: Subject to any disclaimer, the term of this patent is extended or adjusted under 35 U.S.C. 154(b) by 20 days.

(21) Appl. No.: 18/605,625

(22) Filed: Mar. 14, 2024

(65) Prior Publication Data

US 2024/0220882 A1 Jul. 4, 2024

Related U.S. Application Data

(63) Continuation of application No. 17/354,187, filed on Jun. 22, 2021, now Pat. No. 11,948,104.

(51) Int. Cl.
G06Q 10/0631 (2023.01)
G06N 5/02 (2023.01)
G06N 20/00 (2019.01)
(52) U.S. Cl.
CPC ....... *G06Q 10/063112* (2013.01); *G06N 5/02* (2013.01); *G06N 20/00* (2019.01)
(58) Field of Classification Search
None
See application file for complete search history.

(56) References Cited

U.S. PATENT DOCUMENTS 5,910,987 A 6/1999 Ginter et al.
9,367,823 B1 * 6/2016 Mihalik ................. G06Q 40/06
2008/0005122 A1 * 1/2008 Grems ................... G06Q 10/06
2010/0049737 A1 2/2010 Ambrosio et al.
2010/0306242 A1 12/2010 Chow
(Continued)

FOREIGN PATENT DOCUMENTS

WO WO-2016176233 A1 * 11/2019 ....... G06Q 10/06311

OTHER PUBLICATIONS

Braghin S., et al., "SWAT: Social Web Application for Team Recommendation," 2012 IEEE 18th International Conference on Parallel and Distributed Systems, 2012, pp. 845-850.
(Continued)

*Primary Examiner* — Cory W Eskridge
(74) *Attorney, Agent, or Firm* — Keller Preece PLLC

(57) ABSTRACT

The present disclosure is directed toward systems, methods, and non-transitory computer readable media for identifying and recommending team members for target users from a content management system utilizing a machine learning approach. In particular, the disclosed systems can generate a set of candidate team members from among users of the content management system based on various factors such as access to a common digital content item. In some embodiments, the disclosed systems further determine recommended team members from among the set of candidate team members. For example, the disclosed systems can utilize a machine learning approach to generate or predict recommended team members based on particular features extracted or determined for, or with respect to, the various candidate team members. In certain implementations, the disclosed systems further provide a recommended-team-member notification to notify a target user of a recommended team member.

20 Claims, 14 Drawing Sheets

(56)     References Cited

U.S. PATENT DOCUMENTS

| 2019/0079780 | A1  | 3/2019  | Coven et al. | |
| 2019/0347105 | A1  | 11/2019 | Cella | |
| 2020/0099663 | A1  | 3/2020  | Kapoor et al. | |
| 2020/0410024 | A1  | 12/2020 | Noble et al. | |
| 2021/0103863 | A1  | 4/2021  | Hiller et al. | |
| 2021/0319386 | A1* | 10/2021 | Chang | H04L 67/306 |

OTHER PUBLICATIONS

Non-Final Office Action from U.S. Appl. No. 17/354,187, mailed Jun. 23, 2023, 12 pages.

Notice of Allowance from U.S. Appl. No. 17/354,187, mailed Dec. 18, 2023, 8 pages.

* cited by examiner

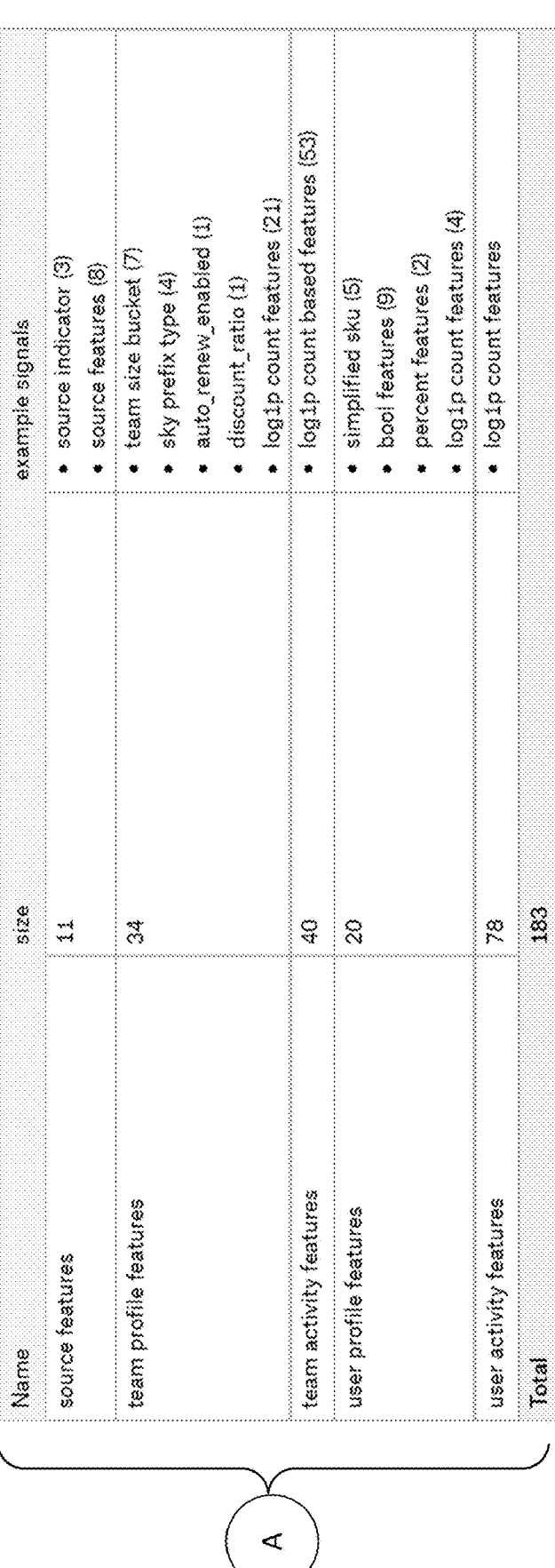

| Name | size | example signals |
|---|---|---|
| source features | 11 | • source indicator (3)<br>• source features (8) |
| team profile features | 34 | • team size bucket (7)<br>• sku prefix type (4)<br>• auto_renew_enabled (1)<br>• discount_ratio (1)<br>• log1p count features (21) |
| team activity features | 40 | • log1p count based features (53) |
| user profile features | 20 | • simplified sku (5)<br>• bool features (9)<br>• percent features (2)<br>• log1p count features (4) |
| user activity features | 78 | • log1p count features |
| Total | 183 | |

*Fig. 4*

1000
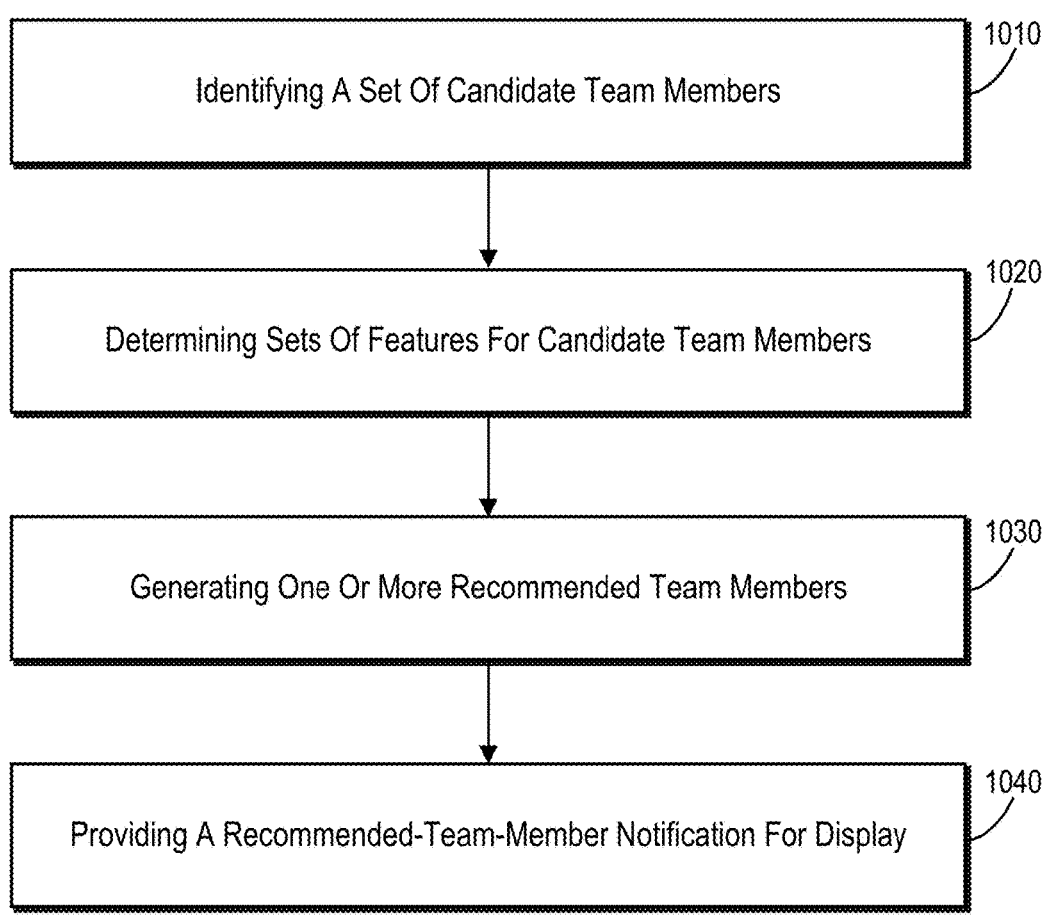
1010
Identifying A Set Of Candidate Team Members
1020
Determining Sets Of Features For Candidate Team Members
1030
Generating One Or More Recommended Team Members
1040
Providing A Recommended-Team-Member Notification For Display
*Fig. 10*

1200

GENERATING AND PROVIDING TEAM MEMBER RECOMMENDATIONS FOR CONTENT COLLABORATION

CROSS REFERENCE TO RELATED APPLICATION

This application is a continuation of U.S. application Ser. No. 17/354,187 filed on Jun. 22, 2021. The aforementioned application is hereby incorporated by reference in its entirety.

BACKGROUND

Advancements in computing devices and networking technology have led to a variety of innovations in providing digital content to, and sharing digital content among, user accounts. For example, online digital content systems can now provide access to digital content items across many devices all over the world. Existing systems can also synchronize changes to shared digital content across the devices. Indeed, whether in education, employment, or other areas, modern online digital content systems can provide access to digital content for users to collaborate together across diverse physical locations and over a variety of computing devices. Despite these advances, however, existing digital content systems continue to suffer from a number of disadvantages, particularly in terms of accuracy, efficiency, and flexibility.

As just suggested, existing digital content systems often generate inaccurate collaboration recommendations. More specifically, some existing systems identify groups or teams of collaborating co-users utilizing inaccurate computational models. To elaborate, certain prior systems apply limited computational models that sometimes erroneously determine relationships between users and/or memberships of users within groups based on how users within the system interact with digital content and/or with one another. Indeed, some existing systems sometimes rely on heuristic models that base membership determinations on small numbers of factors that often mis-group, or even entirely neglect, users that should be included within a common collaborative team.

Due at least in part to their inaccurate nature, existing digital content systems inefficiently utilize computing resources, such as processing time, processing power, and memory. In particular, because existing systems often fail to identify users that should be included within a team and/or identify users that should not be included within a team, these systems sometimes provide multiple redundant recommendations for team members that get repeatedly sent to but ignored by recipient computing devices (thereby wasting computing resources). Additionally, some prior systems use computational models that require excessive processing by repeatedly applying a lengthy heuristic analysis to large numbers of digital files for adding users to respective teams.

In addition to the aforementioned inaccuracies, many existing digital content systems provide inefficient graphical user interfaces that often require an excessive number of user interactions. Indeed, some existing systems provide cumbersome user interfaces that hamper, or reduce the efficiency of, the addition of a user to a particular team. For example, existing systems often require a client device or a server to process many user interactions for navigating between different interfaces, through several layers, to locate a user belonging to a team. Having to repeat the process of navigating through the various interfaces for adding each user to a team further compounds the number of user interactions required by existing systems. Additionally, processing these user interactions wastes computing resources that could otherwise be avoided.

As suggested above, existing digital content systems are also inflexible. To elaborate, some existing systems rigidly apply a particular set of heuristic criteria or other computational model for identifying the team members. Indeed, prior systems often utilize a fixed set of heuristic criteria to identify accounts that are likely candidates for a particular team. Because of the fixed nature of the criteria used in their analysis, these systems are not adaptable to changing circumstances within a system and/or changes among the user accounts themselves. Such rigidity can result in further inaccuracies in identifying team members, especially in cases where users establish new connections through recent activity and/or where new users are added to a system.

Thus, there are several disadvantages with regard to existing digital content systems.

SUMMARY

This disclosure describes one or more embodiments of systems, methods, and non-transitory computer readable storage media that provide benefits and/or solve one or more of the foregoing and other problems in the art. For instance, the disclosed systems utilize machine learning to identify and recommend users of a content management system as team members to a target user. In particular, the disclosed systems can generate a set of candidate team members from among users of the content management system with digital accounts or addresses in a common domain and/or with access to a common digital content item, among other possible factors. In some embodiments, the disclosed systems further determine or generate recommended team members from among the set of candidate team members.

For example, the disclosed systems can utilize a machine learning approach to generate or predict recommended team members based on particular features extracted or determined for the various candidate team members. In certain implementations, the disclosed systems further provide a recommended-team-member notification to a target user identifying a recommended team member. Based on user selection via the notification or an automatic system determination, in some cases, the disclosed systems further provide an invitation to a recommended team member to join a content-collaboration team. By utilizing the aforementioned machine learning approach, the disclosed systems can accurately, efficiently, and flexibly determine and recommend team members for a target user of a content management system.

Additional features and advantages of the present application will be set forth in the description which follows, and in part will be obvious from the description, or may be learned by the practice of such example implementations.

BRIEF DESCRIPTION OF THE DRAWINGS

This disclosure will describe one or more implementations of the inventions with additional specificity and detail by referencing the accompanying figures. The following paragraphs briefly describe those figures, in which:

FIG. 4 illustrates determining features associated with candidate team members in accordance with one or more embodiments;

FIG. 10 illustrates a flowchart of a series of acts of determining and suggesting recommended team members for a target user via a machine learning approach in accordance with one or more embodiments;

DETAILED DESCRIPTION

Figure 1:
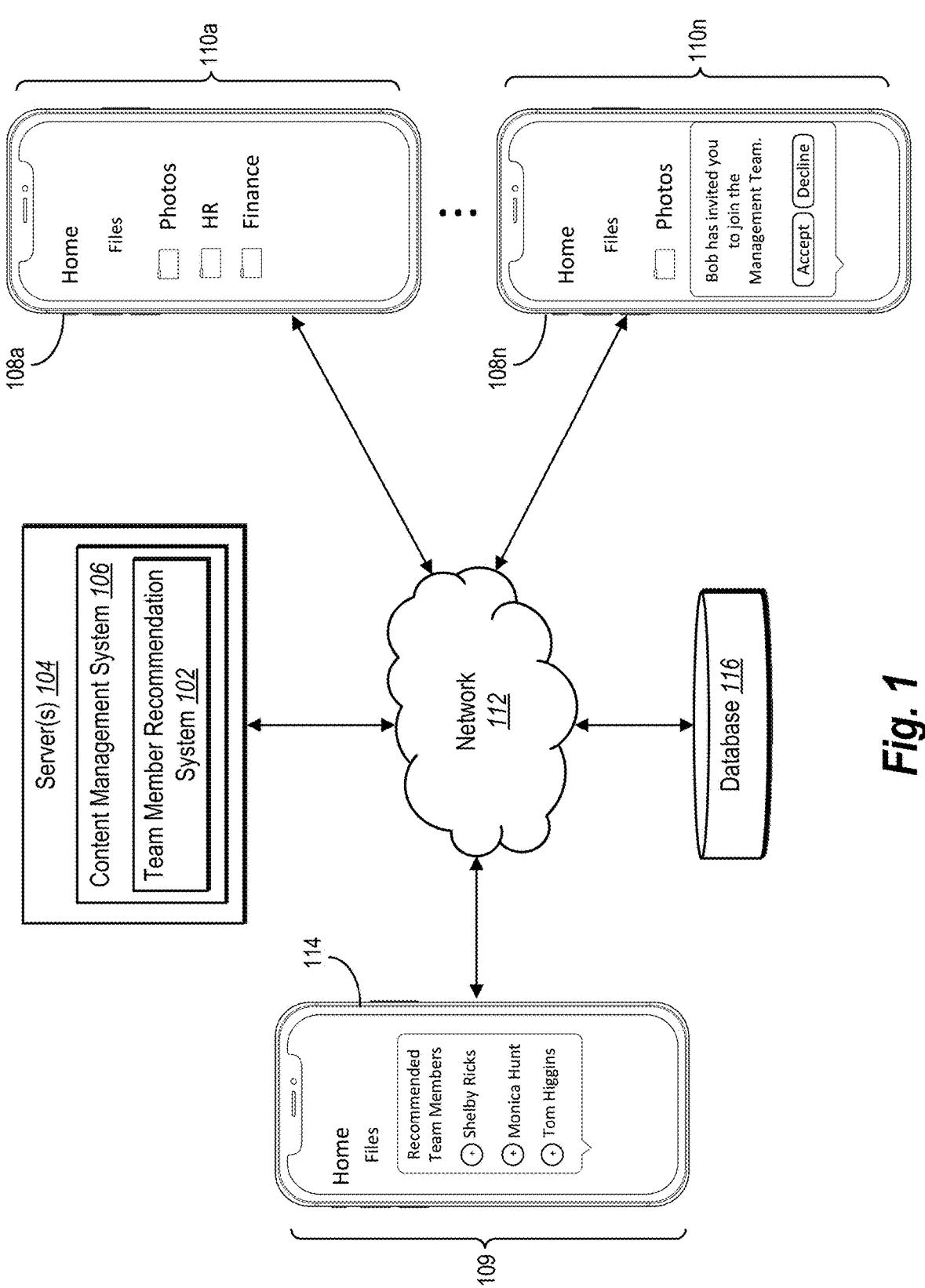
FIG. 1 illustrates a schematic diagram of an example environment of a team member recommendation system in accordance with one or more embodiments.

This disclosure describes one or more embodiments of a team member recommendation system that can identify and select recommended team members from a set of users within a content management system utilizing a team-member-prediction-machine-learning model. In some embodiments, the team member recommendation system determines candidate team members for a content-collaboration team of a target user by identifying users within the content management system that have access to a digital content item in common with the target user and/or that belong to the same domain as the target user within the content management system. In addition, the team member recommendation system can determine which of the candidate team members to recommend for a content-collaboration team of the target user based on features associated with the respective candidate team members.

For example, the team member recommendation system can determine various types of features associated with the candidate team members and can utilize a team-member-prediction-machine-learning model to process the features to determine which of the candidate team members to suggest as recommended team members for the target user. Based on selecting one or more recommended team members, the team member recommendation system can further provide a recommended-team-member notification to a client device of the target user indicating the recommended team member.

As just suggested, the team member recommendation system can identify a set of candidate team members from among a plurality of users of a content management system. To elaborate, the team member recommendation system utilizes a number of factors to filter users of the content management system to identify those users that are candidate team members for a content-collaboration team of the target user. For example, the team member recommendation system identifies users that have access to a digital content item in common with the target user (e.g., that the target user also has access to). In some cases, the team member recommendation system also (or alternatively) identifies users that have access to a folder of digital content items in common with the target user. In these or other cases, the team member recommendation system further (or alternatively) identifies users with digital addresses that belong to a domain in common with the digital address of the target user within the content management system. For instance, the team member recommendation system identifies users with accounts that have the same internet-based domain within the content management system corresponding to a common entity, such as a company, a school district, a government body, a private organization, or some other group.

In certain implementations, the team member recommendation system utilizes additional or alternative factors to filter users for identifying candidate team members. For example, the team member recommendation system identifies users that have a particular connection to the target user and/or that have a connection with a user who, in turn, has a connection with the target user. To elaborate, the team member recommendation system can identify first-level collaborators (e.g., users who have collaborated directly with the target user), second-level collaborators (e.g., users who have collaborated with first-level collaborators), and/or collaborators on other levels of connection with the target users. For instance, the team member recommendation system can identify users or collaborators based on their degree of separation from the target user based on previous interaction.

In some cases, the team member recommendation system identifies users who have interacted directly with the target user. In addition, the team member recommendation system can identify users who have previously interacted with other users who, in turn, have previously interacted with the target user (e.g., users who are one degree of separation from the target user within the content management system). In some cases, the team member recommendation system determines the connections between users based on interactions on a general basis (e.g., any communication, sharing of digital content items, or interaction between users within the content management system). In other cases, the team member recommendation system determines only certain interactions to be relevant for indicating candidate team members (e.g., interactions that indicate, mention, or are otherwise relevant to a content-collaboration team of the target user).

Based on identifying a set of candidate team members from among users of the content management system, the team member recommendation system can further select those candidate team members to suggest as recommended team members. In particular, the team member recommendation system can determine various types of features associated with the candidate team members. For example, the team member recommendation system determines, for a given candidate team member, a set of features that includes one or more of source features, team features, or candidate-team-member features. More specifically, the team member recommendation system can determine source features by determining features corresponding to connections between the target user and the candidate team member. In addition, the team member recommendation system can determine team features by determining features corresponding to the content-collaboration team of the target user. Further, the team member recommendation system can determine candidate-team-member features by determining features corresponding to the candidate team member.

As mentioned above, the team member recommendation system can further determine or select recommended team members from among the candidate team members based on the features associated with the respective candidate team members. For instance, the team member recommendation system can utilize a team-member-prediction-machine-learning model to generate recommended team members. More specifically, the team member recommendation system can input sets of features into the team-member-prediction-machine-learning model, whereupon the team-member-prediction-machine-learning model can generate recommendation scores for the candidate team members by analyzing the sets of features. Additionally, the team member recommendation system can select one or more recommended team members based on the recommendation scores.

Based on selecting a recommended team member, the team member recommendation system can further provide a recommended-team-member notification to a client device associated with the target user. Indeed, the team member recommendation system can provide a notification indicating the recommended team member. In some cases, the team member recommendation system further includes, within the recommended-team-member notification, a selectable option to provide an invitation to join a content-collaboration team to the recommended team member. In other cases, the team member recommendation system automatically (e.g., without requiring additional user input) invitations the recommended team member to join the content-collaboration team.

The team member recommendation system can therefore add the recommended team member to a content-collaboration team of the target user based on receiving an indication of user interaction accepting the invitation. Indeed, the team member recommendation system can receive or detect acceptance of the invitation to join the content-collaboration team from a client device associated with the recommended user. In turn, the team member recommendation system further adds the recommended team member to the content-collaboration team within the content management system.

In some embodiments, the team member recommendation system further updates parameters of the team-member-prediction-machine-learning model through a training process. For example, the team member recommendation system trains the team-member-prediction-machine-learning model to improve its accuracy in generating recommendation scores and/or indicating whether or not candidate team members are likely to be invited to join a content-collaboration team. As part of the training process, the team member recommendation system can identify an invitation provided to a recommended team member to use as a ground truth. In some cases, the team member recommendation system can also (or alternatively) identify instances where a recommended team member is not invited to serve as a ground truth for the negative circumstance.

In any event, the team member recommendation system can further identify updated sets of features for candidate team members that led up to, or resulted in, the invitation (or the non-invitation). In addition, the team member recommendation system can input the updated sets of features into the team-member-prediction-machine-learning model to generate predicted recommendation scores indicating likelihoods of inviting the respective candidate team members. Further, the team member recommendation system can compare the predicted recommendation scores with the ground truth indication of whether or not the candidate team members were actually invited. In some cases, as part of the comparison, the team member recommendation system determines an error or a measure of loss associated with the team-member-prediction-machine-learning model. Based on the comparison, the team member recommendation system can modify parameters of the team-member-prediction-machine-learning model to reduce the measure of loss and thereby improve accuracy of the team-member-prediction-machine-learning model for subsequent predictions. The team member recommendation system can further repeat this training process for many iterations or epochs until the measure of loss satisfies a threshold loss or other criteria.

In certain cases, the team member recommendation system updates the parameters of the team-member-prediction-machine-learning model on a periodic basis (e.g., daily, weekly, or monthly). For instance, the team member recommendation system identifies invitations provided for a particular time period (e.g., the previous 24 hours, 48 hours, or 72 hours) leading up to a most recent invitation and further determines updated sets of features for candidate team members pertaining to the time period. Using an indication of an invitation as a ground truth, the team member recommendation system further updates parameters of the team-member-prediction-machine-learning model by generating predicted recommendation scores for individual candidate team members, comparing the predictions to the ground truth indications of whether or not the candidate team members were actually invited, and back propagating to adjust or modify parameters of the team-member-prediction-machine-learning model accordingly. Additional detail regarding the training process of the team-member-prediction-machine-learning model is provided below with reference to the figures.

As suggested above, the team member recommendation system can provide several improvements or advantages over existing digital content systems. For example, compared to existing systems, embodiments of team member recommendation systems more accurately identify users of a content management system to suggest as recommended team members. As opposed to existing systems that rely on limited heuristic models, the team member recommendation system can automatically identify recommended team members utilizing a team-member-prediction-machine-learning model. For instance, the team member recommendation system can identify recommended team members by searching through large numbers of users of a content management system to identify candidate team members, determining features associated with the candidate team members, and implementing a team-member-prediction-machine-learning model to select recommended team members from the candidate team members based on their respective features. Indeed, the team member recommendation system determines robust sets of features for candidate team members that establish a more wholistic, complete perspective of team membership than the small, sometimes misleading factors used by some existing systems.

Due at least in part to its improvements in accuracy over existing systems, the team member recommendation system can more efficiently utilize computing resources than existing digital content systems as well. For example, rather than requiring repeated applications of a lengthy heuristic analysis to each digital content item, the team member recommendation system can reduce the computational requirements by utilizing a team-member-prediction-machine-learning model that, due to its improved accuracy, also avoids providing redundant recommendations.

Relatedly, in some embodiments, the team member recommendation system further provides more efficient user interfaces than existing digital content systems. While some existing systems provide cumbersome user interfaces that require many user interactions for a computing device to search through several layers of (or long-scrolling) user interfaces to locate desired data and/or functionality, the team member recommendation system can provide a team member recommendation interface that includes a recommended-team-member notification automatically generated and provided for display. As a result of providing the recommended-team-member notification within the interface, in some embodiments, the team member recommendation system requires only a single click (or even zero clicks, i.e., no interaction) on the part of the target user to add a recommended team member to a content-collaboration team, greatly reducing the number of user interactions compared to existing systems. Thus, the team member recommendation system can avoid wasting computing resources such as processing time, memory, and power in processing the user interactions required by existing systems.

Not only are embodiments of the team member recommendation system more accurate and more efficient than existing digital content systems, but in some embodiments, the team member recommendation system is also more flexible. Compared to models of existing systems, the team member recommendation system utilizes a more flexible machine learning approach by utilizing a first-of-its-kind team-member-prediction-machine-learning model. Indeed, while the models applied by many existing systems rely on a fixed set of heuristic criteria to identify users to recommend as team members (and cannot therefore adapt to various changing circumstances), the team member recommendation system can more flexibly update parameters of a team-member-prediction-machine-learning model to maintain accurate, up-to-date predictions based on changes to various types of features such as source features, team features, or candidate-team-member features. The disclosed team-member-prediction-machine-learning model accordingly represents a first-of-its-kind machine learning model that can input source features, team features, or candidate-team-member features (or a combination of such features) to generate a recommended team member or recommendation score for a candidate team member.

As illustrated by the foregoing discussion, the present disclosure utilizes a variety of terms to describe features and benefits of the team member recommendation system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file such as a digital document file, a digital image file, a digital audio file, a digital video file, a web file, or some other type of file or digital object. A digital content item can have a particular file type or file format, which may differ for different types of digital content items (e.g., digital documents or digital images). A digital content item can be editable or otherwise modifiable and can also be sharable from one user account (or client device) to another. In some cases, a digital content item is modifiable by multiple user accounts (or client devices) simultaneously and/or at different times.

As mentioned, the team member recommendation system can identify a set of candidate team members from among a set of users of a content management system. As used herein, the term "candidate team member" refers to a user or an associated user account within the content management system that is designated as a candidate or a possibility for joining a particular collaborative-content team. For example, a candidate team member can include a user account that has access to a digital content item (or a file of digital content items) in common with a target user. In addition, a candidate team member can include a user account that has a connection with (e.g., that have previously interacted with) the target user and/or that have a connection with one or more other user accounts that have a connection with the target user (e.g., within one degree of separation of the target user).

As just mentioned, in some embodiments, the team member recommendation system identifies candidate team members in relation to a particular target user. As used herein, the term "target user" refers to a user or an associated user account within a content management system that is designated as a target for searching for and providing recommended team members. For example, a target user includes a user account belonging to a content-collaboration team that the team member recommendation system uses as a basis for suggesting recommended team members. In some cases, a target user refers to a user account that has certain permissions within the content management system, such as an administrator or manager account of a content-collaboration team.

Relatedly, the term "recommended team member" refers to a user or an associated user account within a content management system that is identified or selected to recommend to a target user for a content-collaboration team or other group or team of the target user. For example, a recommended team member includes a user account selected from a set of candidate team members based on various features of various candidate team members. In some cases, a recommended team member includes a candidate team member whose recommendation score satisfies a recommendation-score threshold and/or includes a candidate team member within a number of candidate team members with the highest recommendation scores (e.g., the top 5 or top 10).

In addition, the term "content-collaboration team" (or sometimes simply "team") refers to a number or a collection of user accounts belonging to a common group, ontology, or project within a content management system or users accounts with access to digital files for such a group, ontology, or project. For example, a content-collaboration team includes a collection of user accounts who have access to a common set of digital content items within one or more folders maintained by the content management system (e.g., within the "cloud"). A content-collaboration team sometimes includes user accounts within a common domain and/or that collaborate together on various projects within a content management system. In some cases, a content-collaboration team includes team members with different levels of permission, such as administrator users with more permissions to manage digital content items as well as permissions to manage other team members that have fewer permissions.

In some embodiments, the team member recommendation system utilizes a machine learning approach by implementing a machine learning model to determine recommended team members. As used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks.

Relatedly, the term "team-member-prediction-machine-learning model" refers to a machine learning model that generates recommendation scores for identifying or selecting recommended team members for a target user. For example, a team-member-prediction-machine-learning model generates recommendation scores for candidate team members based on various features associated with the candidate team members. Relatedly, the term "feature" refers to a representation of an attribute or a characteristic extracted from, or determined for, a candidate team member. For example, a feature can refer to a numerical or mathematical representation of a characteristic pertaining to a particular source of candidate team member (e.g., a connection with the target user), information pertaining to a content-collaboration team of the target user, and/or information pertaining to the candidate team member themselves. In some embodiments, a team-member-prediction-machine-learning model includes a particular structure or architecture, such as a deep neural network, for analyzing or processing features to generate recommendation scores.

As used herein, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., generated recommendation scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network. Upon training as described below, such a neural network may become a team-member-prediction-neural network.

In addition, the term "recommendation score" refers to a score indicating a likelihood or a probability that a given candidate team member belongs or should belong to, or is part of, a particular content-collaboration team. Accordingly, a recommendation score can also represent a score or a rating of how likely the team member recommendation system is to suggest the corresponding candidate team member as a recommended team member. In some cases, a recommendation score reflects a set of features associated with a candidate team member that, upon analysis by the team-member-prediction-machine-learning model, result in the determination of how likely the candidate team member is to belong or should belong to a content-collaboration team of the target user.

Based on selecting a recommended team member to provide to a target user in accordance with recommendation scores, the team member recommendation system can further provide a recommended-team-member notification to a client device of the target user. As used herein, the term "recommended-team-member notification" refers to a notification provided to a client device of a target user that indicates a recommended team member. For example, a recommended-team-member notification can include a selectable option for providing an invitation to a particular recommended team member. In some cases, a recommended-team-member notification includes an indication of the recommended team member but does not include a selectable option (e.g., when the invitation is automatically sent). In certain embodiments, the recommended-team-member notification is visible via a graphical user interface displayed on the client device of the target user.

Additional detail regarding the team member recommendation system will now be provided with reference to the figures. For example, FIG. 1 illustrates a schematic diagram of an example system environment for implementing a team member recommendation system 102 in accordance with one or more implementations. An overview of the team member recommendation system 102 is described in relation to FIG. 1. Thereafter, a more detailed description of the components and processes of the team member recommendation system 102 is provided in relation to the subsequent figures.

As shown, the environment includes server(s) 104, client devices 108a-108n, a target user client device 114, and a network 112. Each of the components of the environment can communicate via the network 112, and the network 112 may be any suitable network over which computing devices can communicate. Example networks are discussed in more detail below in relation to FIGS. 11-12.

As mentioned above, the example environment includes client devices 108a-108n. Each of the client devices 108a-108n can be one of a variety of computing devices, including a smartphone, a tablet, a smart television, a desktop computer, a laptop computer, a virtual reality device, an augmented reality device, or another computing device as described in relation to FIGS. 11-12. The client devices 108a-108n can communicate with the server(s) 104 via the network 112. For example, the client devices 108a-108n can receive user input from respective users interacting with the client devices 108a-108n (e.g., via the client application 110) to, for example, access, modify, share, or comment on digital content items and/or to interact with content item elements. In turn, the team member recommendation system 102 on the server(s) 104 can receive information relating to various interactions with digital content items and/or user interface elements based on the input received by the client devices 108a-108n (e.g., to access, edit, and/or share the digital content items). In some implementations, user accounts associated with particular (or a subset of) client devices 108a-108n can belong to a particular content-collaboration team and have access to a common collaborative team space that includes team-specific digital content items.

In addition, the example environment includes a target user client device 114. Like the client devices 108a-108n, the target user client device 114 can be one of a variety of computing devices, including a smartphone, a tablet, a smart television, a desktop computer, a laptop computer, a virtual reality device, an augmented reality device, or another computing device as described in relation to FIGS. 11-12. The target user client device 114 can communicate with the server(s) 104 via the network 112. For example, the target user client device 114 can receive user input from a target user interacting with the target user client device 114 (e.g., via the client application 109) to access, comment, share, or modify digital content items and/or to interact with a recommended-team-member notification. In turn, the team member recommendation system 102 can receive data pertaining to the various interactions to propagate changes to digital content items maintained by the server(s) 104 to one or more of the client devices 108a-108n and/or to provide invitations to content-collaboration teams to client devices associated with recommended team members.

As shown, the target user client device 114 and the client devices 108a-108n can respectively include client applications 109 and 110a-110n, respectively. In particular, the client applications 109 and 110a-110n may be web applications, native applications installed on the target user client device 114 and/or the client devices 108a-108n (e.g., a mobile application, a desktop application, etc.), or cloud-based applications where all or part of the functionality is performed by the server(s) 104. Based on instructions from the client applications 109 and 110a-110n, the target user client device 114 and/or the client devices 108a-108n can present or display information, including a user interface such as a content management interface that includes elements for (team-specific) digital content items or a team member recommendation interface that includes a recommended-team-member notification. Additionally, the client devices 108a-108n, through the client applications 110a-110n, can present information in the form of digital content items and can facilitate user interaction with the digital content items to access, modify, share, and/or comment on the digital content items. Further, a target user can interact with graphical user interfaces of the client application 109 to provide user input to select an option within a recommended-team-member notification to provide an invitation to a recommended to member to join a content-collaboration team. In some cases, the team member recommendation system 102 further determines features associated with various users (e.g., candidate team members) based on user interactions with each other (e.g., digital communications via a content management system 106) and/or with various digital content items. As shown, the client application 109 on the target user client device 114 displays a team member recommendation interface that includes a recommended-team-member notification. The client applications 110a-110n on the client devices 108a-108n displays a similar user interface, one with an invitation notification to join a content-collaboration team, and another without.

As illustrated in FIG. 1, the example environment also includes the server(s) 104. The server(s) 104 may generate, track, store, process, receive, and transmit electronic data, such as digital content items, interactions with digital content items, interactions between users, features associated with users, provided invitations for content-collaboration teams, and accepted invitations for content-collaboration teams. For example, the server(s) 104 may receive data from the target user client device 114 and/or the client devices 108a-108n in the form modifications, accesses, shares, or comments for digital content items. In addition, the server(s) 104 can transmit data to the target user client device 114 and/or the client devices 108a-108n in the form of updates to user interfaces depicting various changes based on the modifications, accesses, shares, and comments. Indeed, the server(s) 104 can communicate with the target user client device 114 and the client devices 108a-108n to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the team member recommendation system 102 as part of a content management system 106. The content management system 106 can communicate with the target user client device 114 and/or the client devices 108a-108n to perform various functions associated with the client applications 109 and/or 110a-110n such as managing user accounts, determining features associated with users of the content management system 106, identifying which digital content items are accessible by which users of the content management system 106, synchronizing modifications, comments, shares, and other information across the target user client device 114 and the client devices 108a-108n, and facilitating user interaction with the digital content items to modify, comment, and share the digital content items. In addition, the content management system 106 and/or the team member recommendation system 102 can access and utilize a team-member-prediction-machine-learning model to generate recommendation scores for determining recommended team members for a target user associated with the target user client device 114. In some embodiments, the team member recommendation system 102 and/or the content management system utilize a database 116 to store and access information such as digital content items, user accounts, various types of features described herein, and other information.

Although FIG. 1 depicts the team member recommendation system 102 located on the server(s) 104, in some implementations, the team member recommendation system 102 may be implemented by (e.g., located entirely or in part) on one or more other components of the environment. For example, the team member recommendation system 102 may be implemented by the target user client device 114, the client devices 108a-108n, and/or a third-party device.

In some implementations, though not illustrated in FIG. 1, the environment may have a different arrangement of components and/or may have a different number or set of components altogether. For example, the target user client device 114 and/or the client devices 108a-108n may communicate directly with the team member recommendation system 102, bypassing the network 112. As another example, the environment may include multiple target user client devices, each associated with a different target user for managing digital content items associated with a single content-collaboration team (or separate content-collaboration team). In addition, the environment can include the database 116 located external to the server(s) 104 (e.g., in communication via the network 112) or located on the server(s) 104 and/or located on the target user client device 114 and/or the client devices 108a-108n. Additionally, the environment can include a team-member-prediction-machine-learning model as part of the team member recommendation system 102, stored within the database 116, included as part of the client applications 109 and/or 110a-110n, or housed on the server(s) 104.

Figure 2:
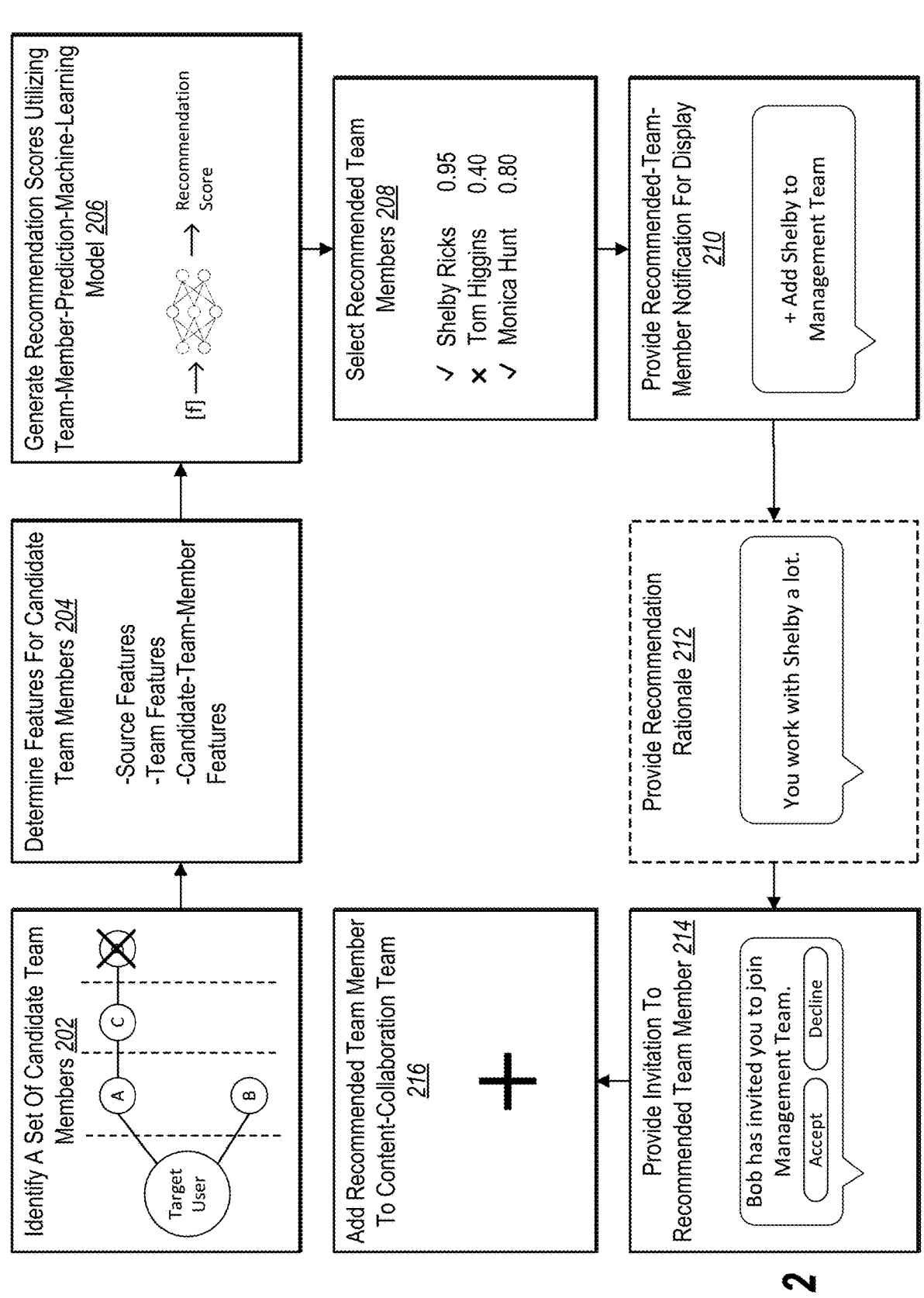
FIG. 2 illustrates an overview of generating and suggesting recommended team members for a target user in accordance with one or more embodiments.

As mentioned above, the team member recommendation system 102 can identify or select recommended team members for a target user from among users of a content management system. In particular, the team member recommendation system 102 can identify candidate team members and can filter the candidate team members to select those that are more likely part of a particular content-collaboration team of the target user. FIG. 2 illustrates an example sequence of acts involved in selecting recommended team members to add to a content-collaboration team. The description of FIG. 2 provides an overview of selecting recommended team members for a target user in accordance with one or more embodiments. Additional detail regarding the various acts is provided thereafter with reference to subsequent figures.

As illustrated in FIG. 2, the team member recommendation system 102 performs an act 202 to identify a set of candidate team members. In particular, the team member recommendation system 102 identifies candidate team members for a target user. In some cases, the team member recommendation system 102 identifies or selects a target user from among users within the content management system 106. For example, the team member recommendation system 102 determines a target user from a particular group of users, such as a content-collaboration team. Specifically, the team member recommendation system 102 determines, as a target user, an administrator account or a manager account associated with a content-collaboration team. In one or more embodiments, the team member recommendation system 102 selects one or more other users as a target user, such as another (e.g., non-administrator) team member of a content-collaboration team (e.g., a user who selects an option to search for additional team members). In certain cases, the team member recommendation system 102 identifies multiple target users for a single content-collaboration team (e.g., multiple administrator users).

As a further basis for identifying candidate team members, in certain embodiments, the team member recommendation system 102 identifies a content-collaboration team for which to identify candidate team members. For example, the team member recommendation system 102 identifies a content-collaboration team associated with a target user (e.g., which includes the target user as a member). In some cases, the team member recommendation system 102 identifies a content-collaboration team as an organization or group of user accounts within the content management system 106 designated as a team of collaborating users sharing one or more common digital content items. In these or other cases, the team member recommendation system 102 identifies multiple content-collaboration teams for a single target user. Consequently, the team member recommendation system 102 also determines candidate team members on a team-specific basis separately for each content-collaboration team and performs the subsequent steps of FIG. 2 for each set of candidate team members, including providing recommended-team-member notification that indicate respective teams for which each recommended user is suggested.

In one or more embodiments, the team member recommendation system 102 identifies candidate team members from among a set of users that are part of (e.g., have user accounts within) a content management system (e.g., the content management system 106). More specifically, the team member recommendation system 102 identifies, as candidate team members, users of the content management system 106 that have access to at least one digital content item in common with a target user (e.g., a digital content item also accessible by the target user). For instance, the team member recommendation system 102 determines which users have permission to access and/or have previously accessed a digital content item that the target user also has permission to access and/or has previously accessed. In certain cases, the team member recommendation system 102 identifies, as candidate team members, users with access to a folder of digital content items in common with the target user.

In some embodiments, the team member recommendation system 102 also (or alternatively) identifies candidate team members from users that belong to a domain common to a digital account or digital address of the target user. In particular, the team member recommendation system 102 identifies users with digital addresses belong to an internet domain to which a digital address of the target user also belongs. For instance, the team member recommendation system 102 determines a domain associated with the target user and further determines domains associated with each of the other users of the content management system 106. In some cases, the team member recommendation system 102 compares domains by comparing digital addresses such as email addresses, IP addresses, or other digital addresses within the content management system 106.

As mentioned above, the team member recommendation system 102 further identifies candidate team members by filtering out those with no connection to the target user. Indeed, the team member recommendation system 102 determines connections between users of the content management system 106 based on previous interactions such as communications, common access to folders and/or files, and/or previous collaboration on project. In certain cases, the team member recommendation system 102 determines different levels of connection of users in relation to a target user. For instance, the team member recommendation system 102 determines degrees of separation of users from the target user based on interactions with the target user.

By way of an example, as shown in FIG. 2, the team member recommendation system 102 determines connections with the target user for users A, B, C, and D. In particular, the team member recommendation system 102 determines that users A and B have had direct interactions with the target user—e.g., users A and B are first-level collaborators in relation to the target user. In addition, the team member recommendation system 102 determines that user C is a second-level collaborator in relation to the target user. Specifically, the team member recommendation system 102 determines that user C has previously interacted with user A (who is a first-level collaborator who has directly interacted with the target user). Further, the team member recommendation system 102 determines that user D is a third-level collaborator. As shown, based on the previous interactions and/or the levels of collaboration, the team member recommendation system 102 selects users A, B, and C as candidate team members but excludes user D. Additional detail regarding determining connections (and different levels of connections) between users is provided below with reference to FIG. 3.

As illustrated in FIG. 2, the team member recommendation system 102 further performs an act 204 to determine features for candidate team members. In particular, the team member recommendation system 102 determines a set of features for each candidate team member within the set of candidate team members (e.g., identified via the act 202). For example, the team member recommendation system 102 determines different types of features associated with a given candidate team member, such as source features, team features, and candidate-team-member features. To determine source features, for example, the team member recommendation system 102 determines features indicating connections between a candidate team member and the target user. To determine team features, the team member recommendation system 102 determines features corresponding to a content-collaboration team associated with the target user. To determine candidate-team-member features, the team member recommendation system 102 determines features corresponding to an individual candidate team member. Additional detail regarding determining the various types of features for candidate team members is provided below with reference to FIG. 4.

As further illustrated in FIG. 2, the team member recommendation system 102 performs an act 206 to generate recommendation scores utilizing a team-member-prediction-machine-learning model. Indeed, the team member recommendation system 102 utilizes a team-member-prediction-machine-learning model to generate or determine recommended team members for the target user. For example, the team member recommendation system 102 determines recommendation scores for candidate team members based on respective features associated with the candidate team members. In some cases, the team member recommendation system 102 inputs a set of features or a feature vector (represented as "[f]" in FIG. 2) for a particular candidate team member into the team-member-prediction-machine-learning model, whereupon the team-member-prediction-machine-learning model generates a recommendation score for the candidate user. Additional detail regarding generating recommendation scores utilizing the team-member-prediction-machine-learning model is provided below with reference to FIG. 5. Thereafter, detail is provided regarding training or tuning the team-member-prediction-machine-learning model with reference to FIG. 7.

As further shown in FIG. 2, the team member recommendation system 102 also performs an act 208 to select recommended team members. In particular, the team member recommendation system 102 selects recommended team members from among the set of candidate team members based on their respective recommendation scores. For example, in some cases, the team member recommendation system 102 ranks candidate team members according to recommendation scores and selects a number of top-ranked candidate team members as recommended team members. In other cases, the team member recommendation system 102 compares recommendation scores for the candidate team members with a recommendation-score threshold and selects those candidate team members whose scores satisfy the threshold as recommended team members. As shown, based on one or more of the above criteria, the team member recommendation system 102 selects candidate team members "Shelby Ricks" (with a recommendation score of 0.95) and "Monica Hunt" (with a recommendation score of 0.80) as recommended team members, while excluding "Tom Higgins" (with a recommendation score of 0.40). Additional detail regarding selecting recommended team members is provided below with reference to FIG. 6.

As further shown in FIG. 2, the team member recommendation system 102 performs an act 210 to provide a recommended-team-member notification for display. In particular, the team member recommendation system 102 generates and provides a notification for display on a client device of the target user. In some embodiments, the team member recommendation system 102 generates the recommended-team-member notification to indicate a single recommended team member (e.g., "Add Shelby to Management Team"). In other embodiments, the team member recommendation system 102 generates the recommended-team-member notification to indicate multiple recommended team members together. In these or other embodiments, the team member recommendation system 102 further provides a selectable option within the recommended-team-member notification to invite a recommended team member to a content-collaboration team or other team or group of the target user. Additional detail regarding generating and providing the recommended-team-member notification is provided below with reference FIGS. 8A-8C.

In certain embodiments, the team member recommendation system 102 also performs an act 212 to provide a recommendation rationale. To elaborate, the team member recommendation system 102 generates and provides a recommendation rationale for display on the client device of the target user. For instance, the team member recommendation system 102 provides a recommendation rationale that indicates or explains a rationale for the team member recommendation system 102 suggesting a particular recommended team member. Example recommendation rationales include, but are not necessarily limited to, an indication of a connection between the target user and the recommended team member, an amount (or a frequency or a recency) of interaction between the target user and the recommended team member overall or over a particular time period, and/or an indication of a number of common digital content items that both the target user and the recommended team member have collaborated on overall or over a particular time period. As shown, the team member recommendation system 102 provides a recommendation rationale indicating to the target user, "You work with Shelby a lot."

As further illustrated in FIG. 2, the team member recommendation system 102 performs an act 214 to provide an invitation to a recommended team member. Indeed, the team member recommendation system 102 provides an invitation to join a content-collaboration team of the target user for display on a client device associated with a recommended team member. In some cases, the team member recommendation system 102 provides the invitation in response to an indication of user selection of a selectable invitation option by the target user (e.g., as part of a recommended-team-member notification).

In other cases, the team member recommendation system 102 automatically (e.g., without additional user input) provides the invitation to the client device of the recommended team member. In certain embodiments, the team member recommendation system 102 subsequently provides an approval message to the client device of the target user to approve the addition of the recommended team member upon receiving an indication that the recommended team member accepts the invitation. In still other cases, the team member recommendation system 102 provides an approval message to an administrator device upon determining that the target user selects to provide an invitation to a recommended team member. For example, the team member recommendation system 102, based on detecting that the target user selects an option to provide an invitation, provides selectable options via the administrator device for an administrator to approve or reject the invitation. Thus, the team member recommendation system 102 provides the invitation to the client device of the recommended team member only upon approval by the administrator.

In some embodiments, the team member recommendation system 102 compares the recommendation scores for the recommended target users with an automatic-invitation-score threshold. For example, the team member recommendation system 102 compares the recommendation scores for the recommended team members Shelby Ricks (0.95) and Monica Hunt (0.80) with an automatic-invitation-score threshold of 0.90. Based on the comparison, the team member recommendation system 102 determines to automatically provide the invitation to a digital account or address of Shelby Ricks because her recommendation score satisfies the threshold, while not automatically inviting Monica Hunt via a digital account or address because her recommendation score does not satisfy the threshold. Instead, the team member recommendation system 102 provides a recommended-team-member notification (e.g., including a selectable invitation option) indicating Monica Hunt as a recommended team member for display on the client device of the target user.

As shown, the team member recommendation system 102 provides the invitation in the form of a notification for display on a client device of a recommended team member. For example, the team member recommendation system 102 provides a notification to the client devices of Shelby Ricks and Monica Hunt, indicating "Bob has invited you to join Management Team." In some cases, the team member recommendation system 102 includes selectable options to accept or decline the invitation.

As further illustrated in FIG. 2, the team member recommendation system 102 performs an act 216 to add a recommended team member to a content-collaboration team. More particularly, the team member recommendation system 102 adds a recommended team member in response to user selection of an accept option to accept an invitation to join a content-collaboration team. In some cases, the team member recommendation system 102 automatically adds a recommended team member (e.g., without requiring user interaction with an accept option). For example, the team member recommendation system 102 automatically adds a recommended team member whose recommendation score satisfies an automatic-adding threshold. Upon adding a recommended team member to a content-collaboration team, the team member recommendation system 102 modifies permissions associated with the user account of the recommended team member to provide access to digital content items and folders associated with the content-collaboration team.

Figure 3:
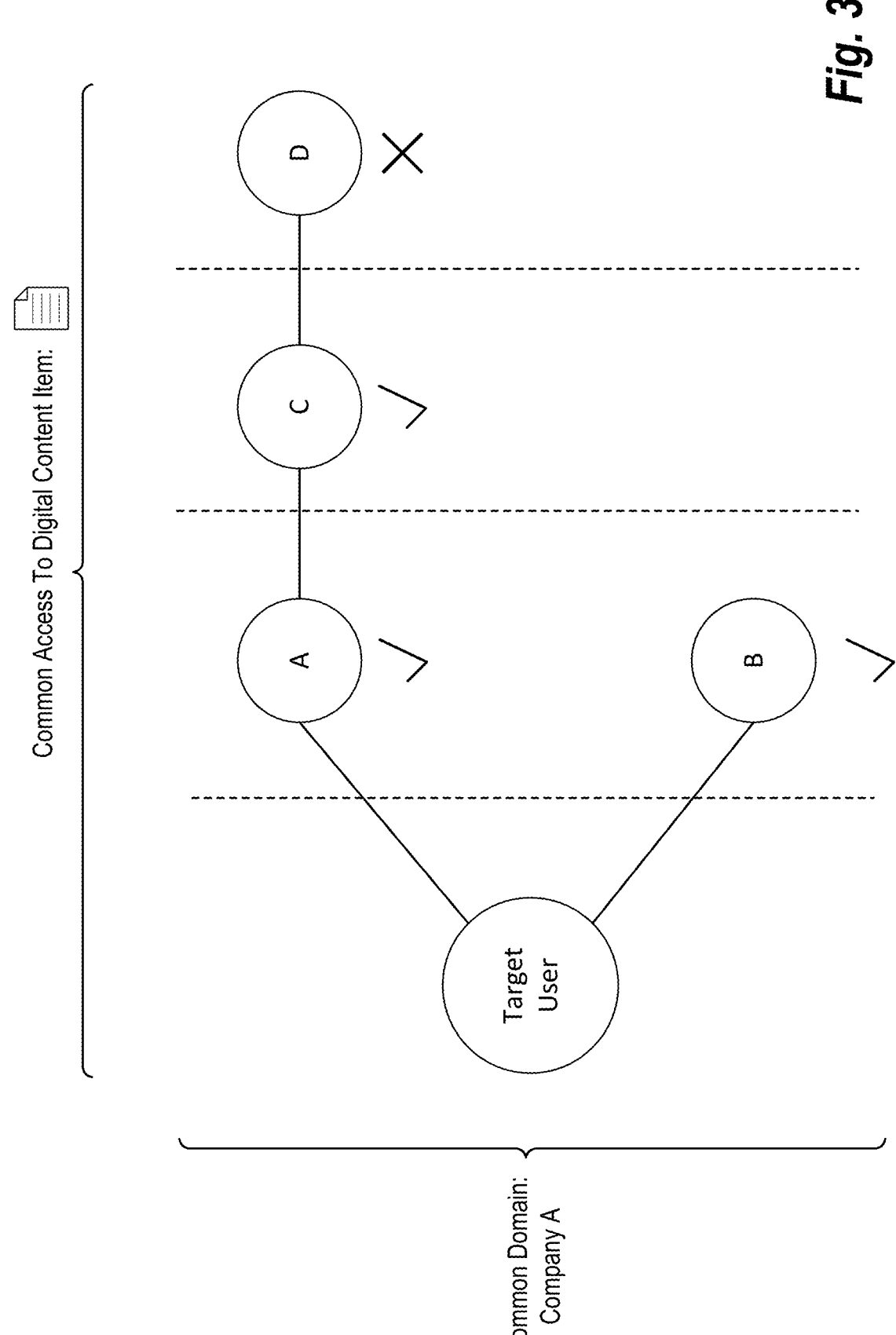
FIG. 3 illustrates identifying a set of candidate team members in accordance with one or more embodiments.

As mentioned above, in certain described embodiments, the team member recommendation system 102 determines or identifies candidate team members for a target user. In particular, the team member recommendation system 102 identifies candidate team members from among a plurality of users of a content management system (e.g., the content management system 106). FIG. 3 illustrates an example connection diagram for identifying candidate team members in accordance with one or more embodiments.

As illustrated in FIG. 3, the team member recommendation system 102 determines users that have common access to a digital content item. To elaborate, the team member recommendation system 102 determines access permissions associated with the target user and further determines access permissions associated with other users (e.g., other users within the content management system 106 that are not already members of the content-collaboration team). Specifically, the team member recommendation system 102 identifies digital content items accessible by the target user and further identifies digital content items accessible by other users. The team member recommendation system 102 further compares the access permissions of the target user with the access permissions of other users to identify users that have access to a digital content item in common with the target user. For instance, the team member recommendation system 102 determines that users A, B, C, and D all have access to a digital content item in common with the target user.

As further illustrated in FIG. 3, in some embodiments, the team member recommendation system 102 determines users that belong to a common domain. More specifically, the team member recommendation system 102 determines or identifies users of the content management system 106 that have digital addresses (e.g., email addresses, IP addresses, user account addresses, or some other form of digital addresses) that belong to the same domain as a digital address of the target user. For instance, the team member recommendation system 102 determines that users A, B, C, and D all belong to a common domain by determining that the email addresses associated with users A, B, C, and D within the content management system 106 all belong to the same internet domain (e.g., "@companyname.com").

In some embodiments, the team member recommendation system 102 does not require that candidate team members share a domain with the target user. Indeed, in some cases, users across various domains wish to collaborate together on the same content-collaboration team. Thus, in some embodiments, the team member recommendation system 102 can enable a target user to whitelist other domains and/or specific user accounts outside of the target user's domain. In still other embodiments, the team member recommendation system 102 may not be restricted by any domain consideration at all.

In addition (or alternatively) to determining access to digital content items and/or domains associated with users, the team member recommendation system 102 also determines connections between users and the target user. Indeed, the team member recommendation system 102 filters the candidate team members based on their connections to the target user. To determine a connection between two users, the team member recommendation system 102 identifies previous interactions between the users. For example, the team member recommendation system 102 identifies previous interactions such as emails, instant messages, edits performed within a shared digital content item, and/or comments within digital content items or other collaborative workspaces. In some cases, the team member recommendation system 102 determines connections using a binary determination where any previous interaction (or at least a previous interaction within a threshold recency or within a certain period of time) indicates that a connection exists between the users (e.g., between the target user and a candidate team member).

In other cases, the team member recommendation system 102 determines different measures or strengths of connections based on numbers and/or frequencies of previous interactions. For example, the team member recommendation system 102 determines stronger connections between users that interact more frequently than for users that interact less frequently. In certain embodiments, the team member recommendation system 102 selects only those users with a connection of at least a threshold strength as candidate team members for the target user.

In addition to determining connections and/or connection strengths between the target user and other users (e.g., users A, B, C, and D), the team member recommendation system 102 also determines connection levels associated with the connections. More specifically, the team member recommendation system 102 determines degrees of separation between the target user and candidate team members with access to a common digital content item and/or belonging to a common domain. For instance, the team member recommendation system 102 identifies candidate team members with direct connections to the target user (e.g., candidate team members who have previous interactions directly with the target user), such as users A and B, as first-level collaborators.

In addition, in some embodiments, the team member recommendation system 102 identifies candidate team members that are one or more degrees of separation removed from the target user. For example, the team member recommendation system 102 determines candidate team members who have not previously interacted directly with the target user (e.g., not accessed or shared same file or document) but who have interacted with first-level collaborators. Specifically, the team member recommendation system 102 identifies, as second-level collaborators (or candidate team members with a second-level connection), candidate team members with connections to first-level collaborators by identifying candidate team members who have previously interacted with candidate team members who, in turn, have previously interacted with the target user. The team member recommendation system 102 further identifies third-level collaborators and so forth for other levels as well, determining degrees of separation between the target user and the candidate team members based on how many connection links are required to connect to the target user.

As further illustrated in FIG. 3, the team member recommendation system 102 determines that users A and B are first-level collaborators while user C is a second-level collaborator and user D is a third-level collaborator. In certain embodiments, the team member recommendation system 102 filters out, or removes from consideration, candidate team members that are beyond a certain connection level from the target user. For example, the team member recommendation system 102 includes candidate team members with first-level and second-level connections, while excluding candidate team members beyond those of the second level. As shown, the team member recommendation system 102 selects users A, B, and C as a set of candidate team members for the target user because they are within the first and second levels. However, the team member recommendation system 102 filters out or excludes user D as a candidate team member for being too far removed from the target user as a third-level collaborator. In certain embodiments, however, the team member recommendation system 102 utilizes a different connection-level threshold to include candidate team members in the third level, fourth level, or some other connection level.

In one or more embodiments, rather than determining connections between candidate team members and the target user, the team member recommendation system 102 determines connections between candidate team members and the content-collaboration team. For example, the team member recommendation system 102 determines previous interactions with members of the content-collaboration team to determine a strength of connection for a candidate team member. Specifically, the team member recommendation system 102 determines the connection (and the connection strength) based on a number of previous interactions, a frequency of previous interactions, a recency of previous interactions, and/or a number of team members with whom the candidate team member has previously interacted. The team member recommendation system 102 thus selects a candidate team member as a user with a connection to the content-collaboration team (but not necessarily with the target user).

As mentioned above, in certain described embodiments, the team member recommendation system 102 determines features associated with candidate team members. In particular, the team member recommendation system 102 determines a set of features for a given candidate team member within a set of candidate team members for a target user.

FIG. 4 illustrates an example table of features associated with a candidate team member in accordance with one or more embodiments.

As illustrated in FIG. 4, the team member recommendation system 102 determines a set of features for the candidate team member A. The team member recommendation system 102 likewise determines sets of features for other candidate team members as well. Indeed, the team member recommendation system 102 determines features of various types. For example, the team member recommendation system 102 determines source features, team features, and/or candidate-team-member features.

In some embodiments, the team member recommendation system 102 determines source features by determining features that indicate or represent how or why the candidate team member was selected as a candidate team member. For example, the team member recommendation system 102 determines source features that indicate the candidate team member's connection to the target user and/or other team members within the content-collaboration team. Indeed, the team member recommendation system 102 can determine a particular number of source features (e.g., 11 source features) for the candidate team member A (and for other candidate team members).

For instance, in some cases, the team member recommendation system 102 determines a source feature that indicates whether the candidate team member is a first-level collaborator or a second-level collaborator. As another example, the team member recommendation system 102 determines a source feature that indicates a rank or a score of the candidate team member as compared to other candidate team members (e.g., based on connection strength) within the same connection level and/or compared to all other candidate team members across all connection levels. As yet another example, the team member recommendation system 102 determines a source feature that represents a number of shared digital content items and/or shared folders accessible by the candidate team member and the target user. Further, the team member recommendation system 102 sometimes determines a feature representing a number of other members of the content-collaboration team with connections to the candidate team member.

In one or more embodiments, the team member recommendation system 102 determines team features for the candidate team member A. Indeed, the team member recommendation system 102 determines team features associated with the content-collaboration team for which the candidate team member A is a candidate to join. For example, the team member recommendation system 102 determines team features of different types such as team profile features and team activity features.

In some embodiments, the team member recommendation system 102 determines team profile features that indicate or represent attributes or characteristics associated with the content-collaboration team of the target user for which the candidate team member A is being analyzed as a candidate to join. For instance, the team member recommendation system 102 determines team profile features that represent or indicate characteristics of the content-collaboration team such as: i) a number of collaborating domains within the content-collaboration team, ii) a number of team members within the content-collaboration team, iii) a total storage usage (e.g., in GB) consumed by the content-collaboration team, iv) a total amount of unshared storage (e.g., in GB) consumed by the content-collaboration team, v) a number of total connections linked by shared folders associated with the content-collaboration team, vi) a number of folders shared amongst members of the content-collaboration team, vii) a number of administrator accounts associated with the content-collaboration team, viii) a number of licenses occupied by joined and/or invited team members, ix) a number of members who utilize a particular software program (e.g., DROPBOX PAPER) within the content-collaboration team, and x) a number of cross-team shared digital content items and/or folders associated with the content-collaboration team. In some cases, the team member recommendation system 102 determines a larger number (e.g., 34) of team profile features.

In addition (or in the alternative) to determining team profile features, in some cases, the team member recommendation system 102 also determines team activity features. In particular, the team member recommendation system 102 determines features that represent or indicate various activities performed by members of the content-collaboration team, such as: i) a number of comments added within a previous time interval (e.g., the last 90 days), ii) a number of comments deleted within a previous time interval, iii) a number of mentions indicating the content-collaboration team over a previous time interval, iv) a number of comments resolved over a previous time interval, v) a number of subscriptions to digital content items associated with the content-collaboration team over a previous time interval, vi) a number of comments unresolved (e.g., indications to remove resolutions from previously resolved comments) over a previous time interval, vii) a number of un-subscriptions to digital content items over a previous time interval, viii) a number of digital content item additions over a previous time interval, ix) a number of digital content item deletions over a previous time interval, x) a number of digital content item edits over a previous timer interval, xi) a number of digital content item requests received over a previous time interval, xii) a number of digital content item requests submitted over a previous time interval, xiii) a number of active team members within the content-collaboration team over one or more time intervals (e.g., 1 day, 1 week, 1 month, 6 months, and/or 1 year), xiv) a number of new digital content item creations over one or more time intervals, xv) a number of digital content item shares over one or more time intervals, xvi) a number of digital content item views over one or more time intervals, and so forth. In some embodiments, the team member recommendation system 102 determines a larger number (e.g., 40) of team activity features.

In addition (or in the alternative) to determining team activity features, in certain embodiments, the team member recommendation system 102 determines candidate-team-member features for the candidate team member A. In particular, the team member recommendation system 102 determines different types of candidate-team-member features, such as candidate-team-member profile features and candidate-team-member activity features-both of which are further explained below. For example, the team member recommendation system 102 determines candidate-team-member profile features that indicate or represent attributes or characteristics of the candidate team member A. Additionally, the team member recommendation system 102 determines candidate-team-member activity features that indicate or represent activities associated with (e.g., performed by) the candidate team member A.

In some cases, the team member recommendation system 102 determines candidate-team-member profile features that indicate characteristics of the candidate team member A, such as: i) an age of the user account of the candidate team member (e.g., in days), ii) a number of digital content items and/or folders shared with and/or by the candidate team member, iii) a number of software applications linked with the user account of the candidate team member, iv) a number of collaborators associated with (e.g., having connections to) the candidate team member, v) a number of collaborators associated with the candidate team member who have shared digital content items and/or folders, vi) an indication of whether or not the candidate team member has linked a particular external software application to their user account on the content management system 106, vii) an indication of whether or not the candidate team member utilizes a particular software application associated with the content management system 106 (e.g., DROPBOX PAPER), viii) an amount of total storage usage by the candidate team member (e.g., in GB), ix) an amount of shared storage usage by the candidate team member (e.g., in GB), and x) an indication of whether the digital address of the candidate team member belongs to a particular domain. In some implementations, the team member recommendation system 102 determines a larger number (e.g., 20) of candidate-team-member profile features for each candidate team member.

Additionally or alternatively, in certain embodiments, the team member recommendation system 102 determines candidate-team-member activity features that indicate or represent activities performed by the candidate team member A, such as: i) a number of active collaborators associated with the candidate team member who have shared digital content items or folders over one or more time intervals (e.g., 1 day, 1 week, and/or 1 month), ii) a number of active shared folders over one or more time intervals, iii) a number of comment engagements over one or more time intervals, iv) a number of comment shares over one or more time intervals, v) a number of active days over one or more time intervals, v) a number of digital content item creations over one or more time intervals, vi) a number of digital content item shares over one or more time intervals, vii) a number of digital content item views over one or more time intervals, viii) a number of digital content item additions to shared folders over one or more time intervals, ix) a number of digital content item edits over one or more time intervals, x) a number of shared link creations over one or more time intervals, xi) a number of shared link downloads over one or more time intervals, xii) a number of shared link views over one or more time intervals, xiii) a number of visits to one or more web pages associated with the content management system 106 (e.g., a low space page, an out of space page, an upgrade page, a buy page, and/or a plans page) over one or more time intervals, and xiv) an indication of a trial of one or more features of the content management system 106 over one or more time intervals. In some embodiments, the team member recommendation system 102 determines a larger number (e.g., 78) of candidate-team-member activity features for each candidate team member.

In one or more implementations, the team member recommendation system 102 determines one or more of the aforementioned features in a variety of different formats. For example, the team member recommendation system 102 determines features in a categorical format (e.g., an encoded vector representing a category). As another example, the team member recommendation system 102 determines features in an indicator or binary format. Further, the team member recommendation system 102 determines features in a percentage format. Additionally, the team member recommendation system 102 determines features having a numerical count.

To utilize the features as input for a team-member-prediction-machine-learning model, the team member recommendation system 102 in one or more implementations encodes the features into numerical or mathematical representations interpretable by the team-member-prediction-machine-learning model. For example, the team member recommendation system 102 encodes categorical features using a one hot encoding. In addition, in one or more implementations, the team member recommendation system 102 utilizes features in an indicator/binary format or a percentage format as-is (e.g., without encoding). Further, in some cases, the team member recommendation system 102 encodes count-based features using the following encoding function: log(1+max(x, 0)), where x is the count associated with the feature.

In one or more embodiments, the team member recommendation system 102 further generates a feature representation corresponding to each candidate team member based on their respective features. For example, the team member recommendation system 102 generates a set of features for a candidate team member in the form of a feature vector. In some cases, the team member recommendation system 102 concatenates the encoded features into a feature vector of a particular length. For instance, the team member recommendation system 102 generates a feature vector including encoded values for each of the aforementioned features for a total feature vector length of 183 entries corresponding to 183 feature values across the various types or categories.

Figure 5:
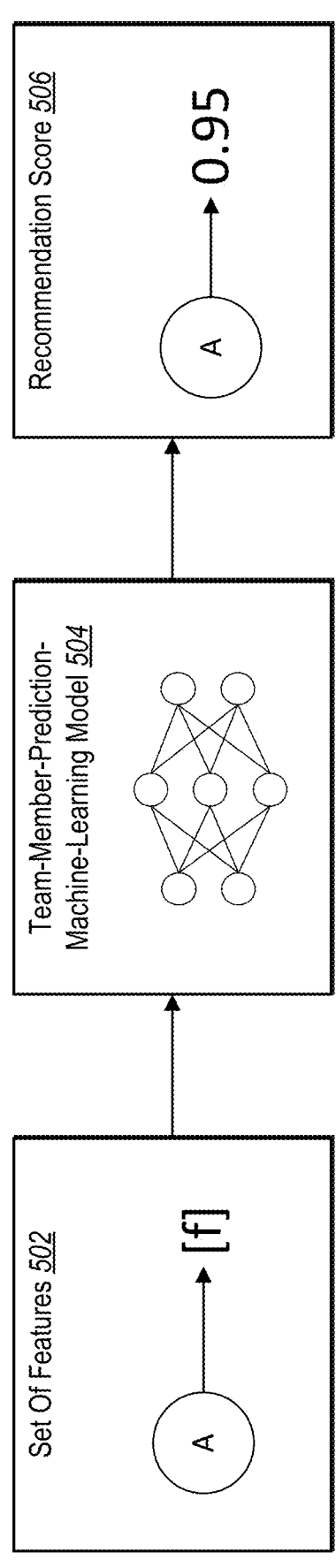
FIG. 5 illustrates generating recommendation scores utilizing a team-member-prediction-machine-learning model in accordance with one or more embodiments.

As mentioned above, in certain described embodiments, the team member recommendation system 102 generates recommendation scores for candidate team members based on their respective features. In particular, the team member recommendation system 102 utilizes a team-member-prediction-machine-learning model to generate recommendation scores for candidate team members. FIG. 5 illustrates an example sequence flow for generating a recommendation score in accordance with one or more embodiments.

As illustrated in FIG. 5, the team member recommendation system 102 accesses, determines, or identifies a set of features 502 for a candidate team member. For example, the team member recommendation system 102 accesses a set of features 502 or a feature vector ("[f]") for the candidate team member A, as described above (e.g., including candidate-team-member features, team features, and/or source features). While the team-member-prediction-machine-learning model 504 can analyze multiple features depending on the input format, the following description uses the feature vector [f] as an example. In addition to accessing the feature vector [f], the team member recommendation system 102 inputs the feature vector [f] into the team-member-prediction-machine-learning model 504, whereupon the team-member-prediction-machine-learning model 504 generates a recommendation score 506.

To elaborate, the team-member-prediction-machine-learning model 504 analyzes or processes the various feature values of the feature vector [f] utilizing its architecture to pass processed data between layers and neurons to generate an output in the form of the recommendation score 506. Indeed, the team-member-prediction-machine-learning model 504 can have a particular architecture, such as a deep neural network with two hidden layers (e.g., a first hidden layer with 128 neurons and a second hidden layer with 64 neurons) for performing convolution operations or otherwise processing the feature vector [f]. For instance, the team-member-prediction-machine-learning model 504 utilizes the hidden layers to generate hidden or latent feature representations from the feature values within the feature vector [f], which may or may not be interpretable by a human observer.

In some cases, the team-member-prediction-machine-learning model 504 can include a fully connected output layer to generate the recommendation score 506 from latent feature representations. For example, the team-member-prediction-machine-learning model 504 generates the recommendation score on a scale from 0 to 1 (or some other scale such as 0 to 100), where higher scores indicate higher recommendation likelihoods. As shown, the team-member-prediction-machine-learning model 504 generates a recommendation score 506 of 0.95 for the candidate team member A. In certain embodiments, the team-member-prediction-machine-learning model 504 analyzes the set of features 502 to perform a (binary) classification operation to classify the candidate team member A as a recommended team member or not a recommended team member. The team member recommendation system 102 likewise repeats the process of generating recommendation scores for other candidate team members utilizing the team-member-prediction-machine-learning model 504.

While in some embodiments the team-member-prediction-machine-learning model 504 is a neural network, in other embodiments the team-member-prediction-machine-learning model 504 is a different type of machine learning model. For example, in one or more embodiments, the team-member-prediction-machine-learning model 504 comprises a random forest model, a support vector machine, a linear regression model, a Bayesian classifier model, or a nearest neighbor model. In some cases, for instance, the team-member-prediction-machine-learning model 504 is a support vector machine that, based on the set of features 502, determines a hyperplane or other division between two groups or classifications: recommended team members and non-recommended team members. In other cases, the team-member-prediction-machine-learning model 504 is a different type of machine learning model that determines whether or not to designate a candidate team member as a recommended team member (e.g., by generating the recommendation score 506 based on the set of features 502).

Figure 6:
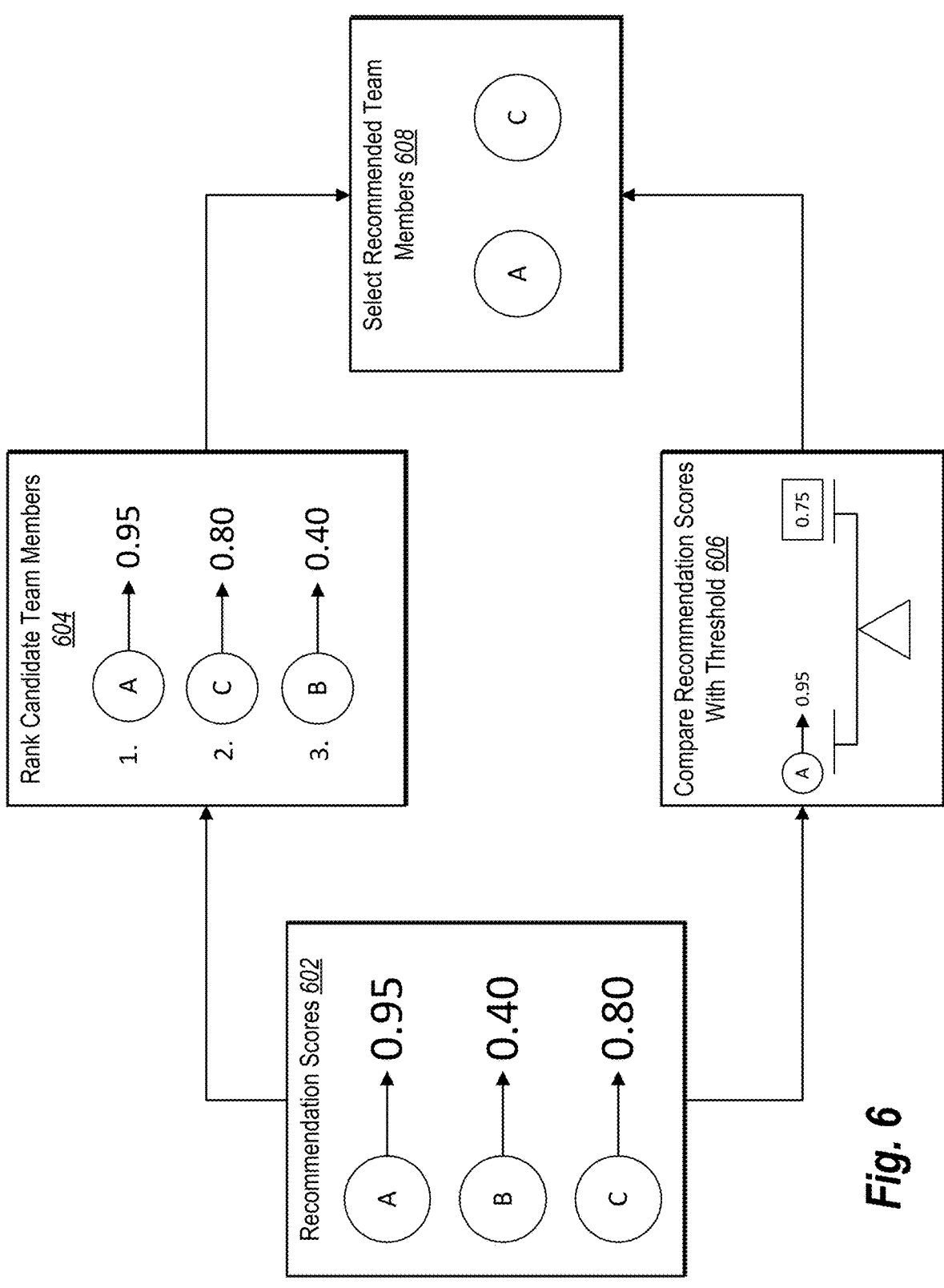
FIG. 6 illustrates selecting recommended team members based on recommendation scores in accordance with one or more embodiments.

As mentioned, in certain embodiments, the team member recommendation system 102 selects recommended team members from among a set of candidate team members. In particular, the team member recommendation system 102 selects recommended team members based on their respective recommendation scores. FIG. 6 illustrates an example sequence flow for selecting recommended team members for a target user in accordance with one or more embodiments.

As illustrated in FIG. 6, the team member recommendation system 102 identifies or accesses recommendation scores 602 for candidate team members. For example, the team member recommendation system 102 accesses recommendation scores 602 stored in the database 116 after utilizing the team-member-prediction-machine-learning model 504 to generate the scores. As shown, the team member recommendation system 102 accesses the recommendation scores 602 for the candidate team members A, B, and C (e.g., the candidate team members selected in accordance with the above description). Candidate team member A has a recommendation score of 0.95, while candidate team member B has a recommendation score of 0.40, and candidate team member C has a recommendation score of 0.80.

As further illustrated in FIG. 6, the team member recommendation system 102 can utilize the recommendation scores to select recommended team members using one or more methods. In some embodiments, the team member recommendation system 102 performs an act 604 to rank the candidate team members according to the recommendation scores 602. More particularly, the team member recommendation system 102 compares the recommendation scores 602 for the candidate team members with one another and ranks the candidate team members accordingly. In some cases, the team member recommendation system 102 ranks the higher-scoring candidate team members higher in the list. As shown, the team member recommendation system 102 ranks the candidate team members in the order A, C, B based on their respective scores.

In one or more embodiments, the team member recommendation system 102 performs an act 606 to compare the recommendation scores 602 with a threshold. More specifically, the team member recommendation system 102 compares the recommendation scores 602 for each of the candidate team members A, B, and C with a recommendation-score threshold. The recommendation-score threshold can indicate a minimum recommendation score required to recommend the candidate team member as a recommended team member. As shown, the team member recommendation system 102 compares the recommendation scores 602 with a recommendation-score threshold of 0.75, though different values are possible for the threshold in various embodiments.

As further illustrated in FIG. 6, the team member recommendation system 102 performs an act 608 to select recommended team members. More specifically, the team member recommendation system 102 selects recommended team members from among the set of candidate team members based on their respective recommendation scores. For example, the team member recommendation system 102 selects a predefined number of top-ranked candidate team members (e.g., a top 2 or a top 5 candidate team members) as recommended team members. As another example, the team member recommendation system 102 selects candidate team members whose recommendation scores satisfy a recommendation-score threshold. As yet another example, the team member recommendation system 102 selects a predefined number of top-ranked candidate team members (e.g., a top 2 or a top 5 candidate team members) that also satisfy a recommendation-score threshold as recommended team members. As shown, the team member recommendation system 102 selects the candidate team members A and C as recommended team members, excluding candidate team member B based on their recommendation score.

In any of the above or other embodiments, in some cases, the team member recommendation system 102 further compares the recommendation scores 602 with an automatic-invitation-score threshold. In particular, the team member recommendation system 102 compares the recommendation scores 602 to determine which scores are high enough for an automatic invitation to join a content-collaboration team (e.g., without needing target user input to send the invitation). For instance, the team member recommendation system 102 performs the act 608 to select the recommended team members and further compares the recommendation scores with an automatic-invitation-score threshold to determine whether or not to automatically invite a particular recommended team member.

In some cases, the automatic-invitation-score threshold is higher than the recommendation-score threshold. For example, the team member recommendation system 102 can utilize an automatic-invitation-score threshold of 0.90 in the example of FIG. 6. Thus, the team member recommendation system 102 selects candidate team members A and C and recommended team members, but only selects candidate team member A for an automatic invitation. For candidate team member C, on the other hand, the team member recommendation system 102 can provide a recommended-team-member notification for display via the target user client device 114.

Figure 7:
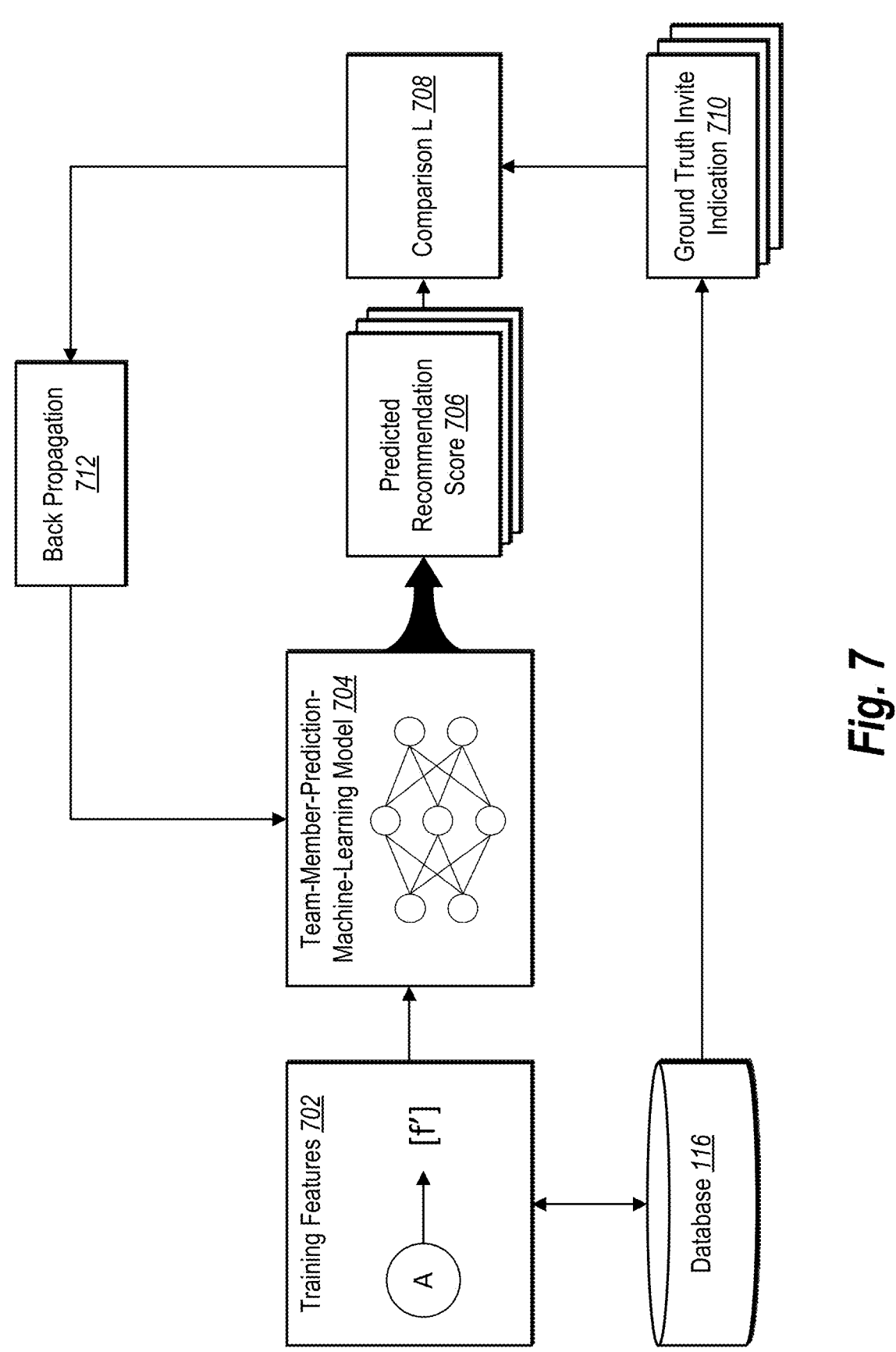
FIG. 7 illustrates training a team-member-prediction-machine-learning model in accordance with one or more embodiments.

As mentioned above, in certain described embodiments, the team member recommendation system 102 trains or tunes a team-member-prediction-machine-learning model (e.g., the team-member-prediction-machine-learning model 504) to generate recommendation scores. In particular, the team member recommendation system 102 updates parameters or weights associated with various layers and/or neurons of the team-member-prediction-machine-learning model 504 to improve its accuracy in generating or predicting recommendation scores for candidate team members. FIG. 7 illustrates an example training process for updating parameters of a team-member-prediction-machine-learning model 704 (e.g., the team-member-prediction-machine-learning model 504) in accordance with one or more embodiments.

As illustrated in FIG. 7, the team member recommendation system 102 identifies or accesses training features 702 from the database 116. In particular, the team member recommendation system 102 accesses training features 702 associated with particular candidate team members to use as a basis for training the team-member-prediction-machine-learning model 704. For example, the team member recommendation system 102 determines features associated with candidate team members, such as source feature, team features, and/or candidate-team-member features, as described above. In addition, the team member recommendation system 102 inputs the training features 702 into the team-member-prediction-machine-learning model 704.

In turn, the team-member-prediction-machine-learning model 704 analyzes the training features 702 by processing and passing data between its layers and neurons according to various internal parameters and/or weights that dictate how the data is processed. Based on the analysis of the training features 702, the team-member-prediction-machine-learning model 704 generates a predicted recommendation score 706. Indeed, the team-member-prediction-machine-learning model 704 generates the predicted recommendation score 706 that reflects or results from the training features 702. In some embodiments, as described above, the team member recommendation system 102 generates the predicted recommendation score 706 on a particular scale (e.g., from 0 to 1) and/or determines a binary classification of whether or not the training features 702 should result in an invitation to join a content-collaboration team.

As further illustrated in FIG. 7, the team member recommendation system 102 performs a comparison 708. In particular, the team member recommendation system 102 compares the predicted recommendation score 706 with a ground truth invite indication 710. To elaborate, the team member recommendation system 102 accesses the ground truth invite indication 710 from the database 116. In some embodiments, the team member recommendation system 102 determines the ground truth invite indication 710 by determining or detecting whether or not the candidate team member associated with the training features 702 was actually provided an invitation.

In some embodiments, the ground truth invite indication 710 is binary and is represented by a 0 or a 1 indicating whether or not the candidate team member was provided an invitation (e.g., by a target user or via an alternative method). Thus, the team member recommendation system 102 compares the prediction of whether or not the candidate team member should be provided an invitation with an indication of whether or not the candidate team member was actually invited. Specifically, the team member recommendation system 102 utilizes a loss function such as an L1 loss function or a cross-entropy loss function to determine an error or a measure of a loss ("L") from the comparison 708. Indeed, the team member recommendation system 102 determines a measure of loss that results from the current parameters or weights of the team-member-prediction-machine-learning model 704.

To reduce the measure of loss in a subsequent training iteration and improve the prediction accuracy of the team-member-prediction-machine-learning model 704, in some cases, the team member recommendation system 102 performs a back propagation 712. More specifically, the team member recommendation system 102 back propagates to modify or update parameters and/or weights of the team-member-prediction-machine-learning model 704. Indeed, the team member recommendation system 102 updates parameters to adjust how the team-member-prediction-machine-learning model 704 processes and passes data.

Additionally, the team member recommendation system 102 repeats the process illustrated in FIG. 7. Indeed, the team member recommendation system 102 repeats the training process for multiple iterations or epochs until the measure of loss associated with the team-member-prediction-machine-learning model 704 (as determined via the comparison 708) satisfies a threshold measure of loss or otherwise satisfies training criteria (e.g., predetermined number of iterations). For example, the team member recommendation system 102 selects new training features to input into the team-member-prediction-machine-learning model 704. The team-member-prediction-machine-learning model 704, in turn, generates a new predicted recommendation score. The team member recommendation system 102 further compares the new predicted recommendation score with a ground truth invite indication corresponding to the new training features. Additionally, the team member recommendation system 102 back propagates to modify parameters of the team-member-prediction-machine-learning model 704 to further reduce the measure of loss resulting from the comparison. Thus, the team member recommendation system 102 repeats this process to train the team-member-prediction-machine-learning model 704 to accurately generate predicted recommendation scores.

In one or more embodiments, the team member recommendation system 102 not only trains the team-member-prediction-machine-learning model 704 initially, but the team member recommendation system 102 also updates the team member recommendation system 102 over time (e.g., on a periodic basis) to maintain accuracy, even with changes among users of the content management system 106. For instance, the team member recommendation system 102 updates features associated with candidate team members every 24 hours (or every week or every month). As shown, the team member recommendation system 102 generates an updated feature vector [f'] for the candidate team member A, which may reflect new source features, new team features, and/or new candidate-team-member features based on new activity or profile changes associated with the candidate team member A.

In some cases, the team member recommendation system 102 updates the features for users of the content management system 106 (e.g., for a particular candidate team member or for all users) in response to receiving an indication of an invitation provided to a recommended team member. More particularly, the team member recommendation system 102 detects or receives an indication that a recommended team member has been provided an invitation to join a content-collaboration team, and the team member recommendation system 102 updates the features associated with the recommended team member for a time period leading up to when the invitation was provided (e.g., the previous day, week, or month). In other cases, the team member recommendation system 102 updates the features on a periodic basis to match the updating of the team-member-prediction-machine-learning model 704 (e.g., utilizing feature(s) from the previous period to train the team-member-prediction-machine-learning model 704 to generate predictions for the current period). Accordingly, the team member recommendation system 102 determines updated features or an updated feature vector ([f']) for the recommended team member (and for other candidate team members) that resulted in providing the invitation.

Based on the updated features, the team member recommendation system 102 updates parameters of the team-member-prediction-machine-learning model 704. Indeed, in some cases, the team member recommendation system 102 updates parameters of the team-member-prediction-machine-learning model 704 in response to detecting an invitation provided to a recommended team member. For instance, the team member recommendation system 102 utilizes the updated feature vector [f'] to input into the team-member-prediction-machine-learning model 704. The team-member-prediction-machine-learning model 704 then generates a predicted recommendation score corresponding to the updated features.

Further, in some such embodiments, the team member recommendation system 102 compares the predicted recommendation score with the indication that the invitation was provided and further back propagates to update the parameters of the team-member-prediction-machine-learning model 704 to reflect the updated features that resulted in the provided invitation. In some cases, not only does the team member recommendation system 102 utilize periodic (e.g., daily) hit labels indicating that an invitation was provided, but the team member recommendation system 102 also utilizes periodic miss labels as well to indicate sets of features that do not result in providing an invitation. Thus, the team member recommendation system 102 frequently updates the parameters of the team-member-prediction-machine-learning model 704 using an iterative process by determining updated features based on indications of provided (and/or not provided) invitations.

Figure 8A:
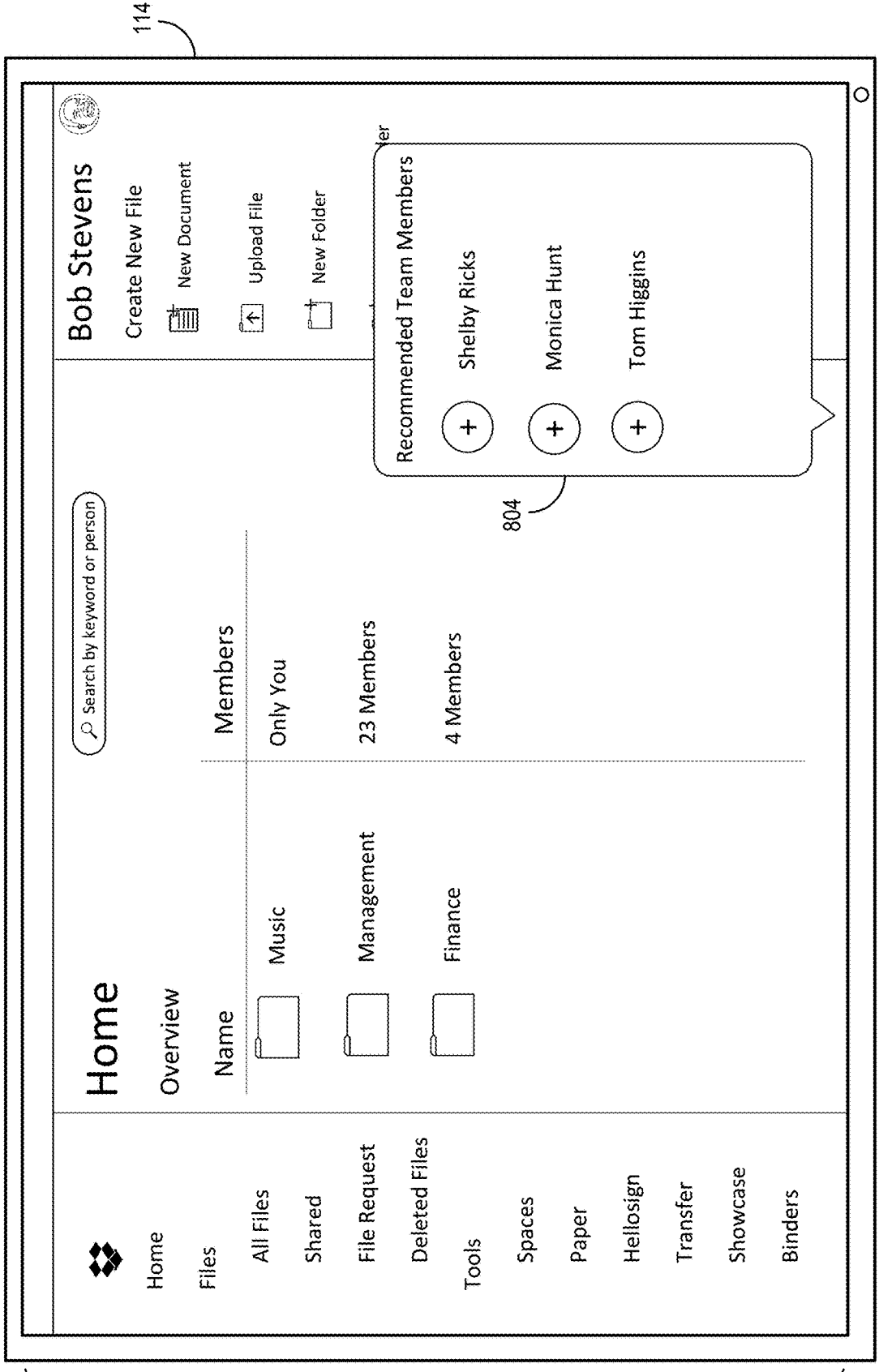
FIGS. 8A-8C illustrate example team member recommendation interfaces displayed on a target user client device in accordance with one or more embodiments.
Figure 8B:
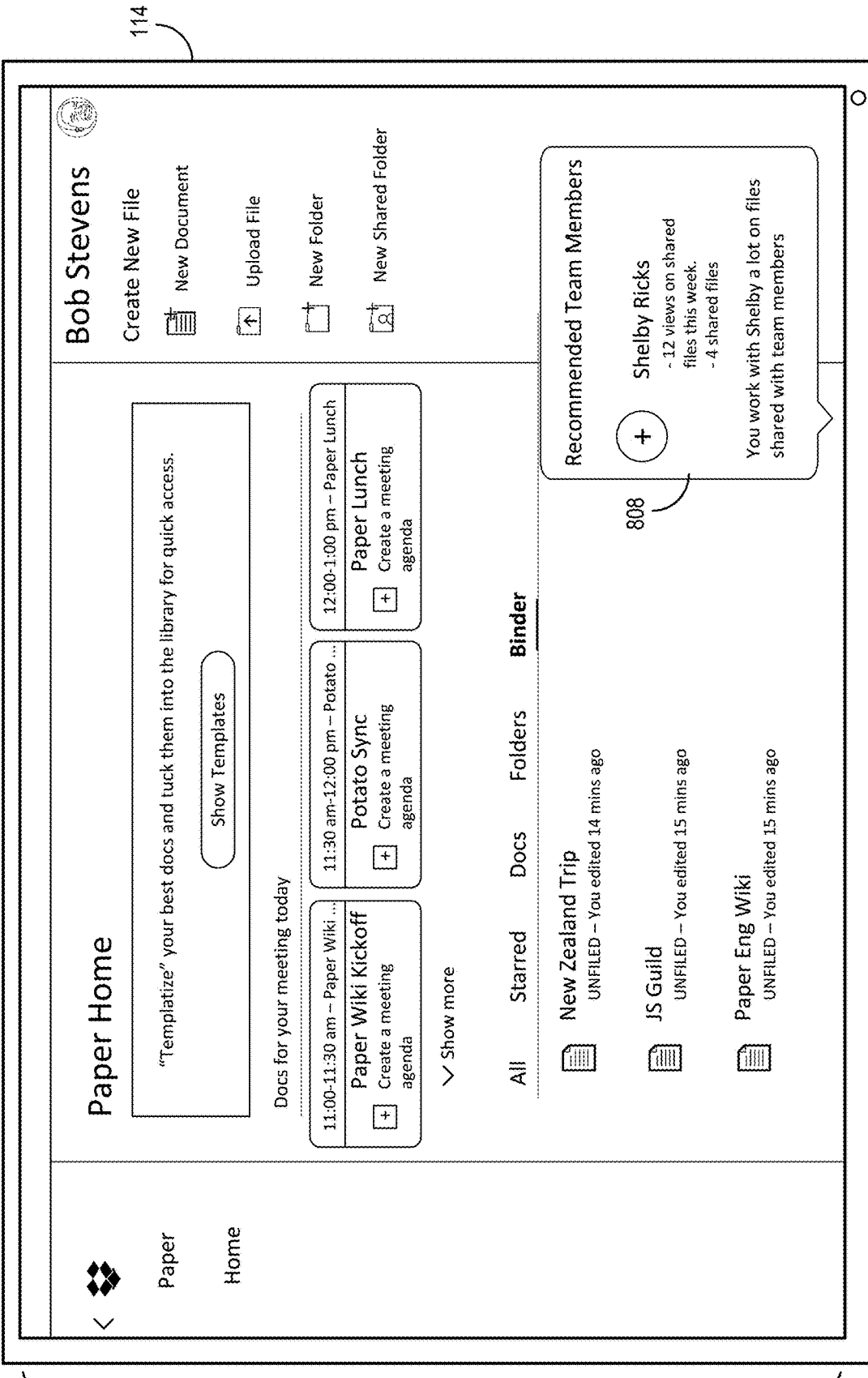
Figure 8C:
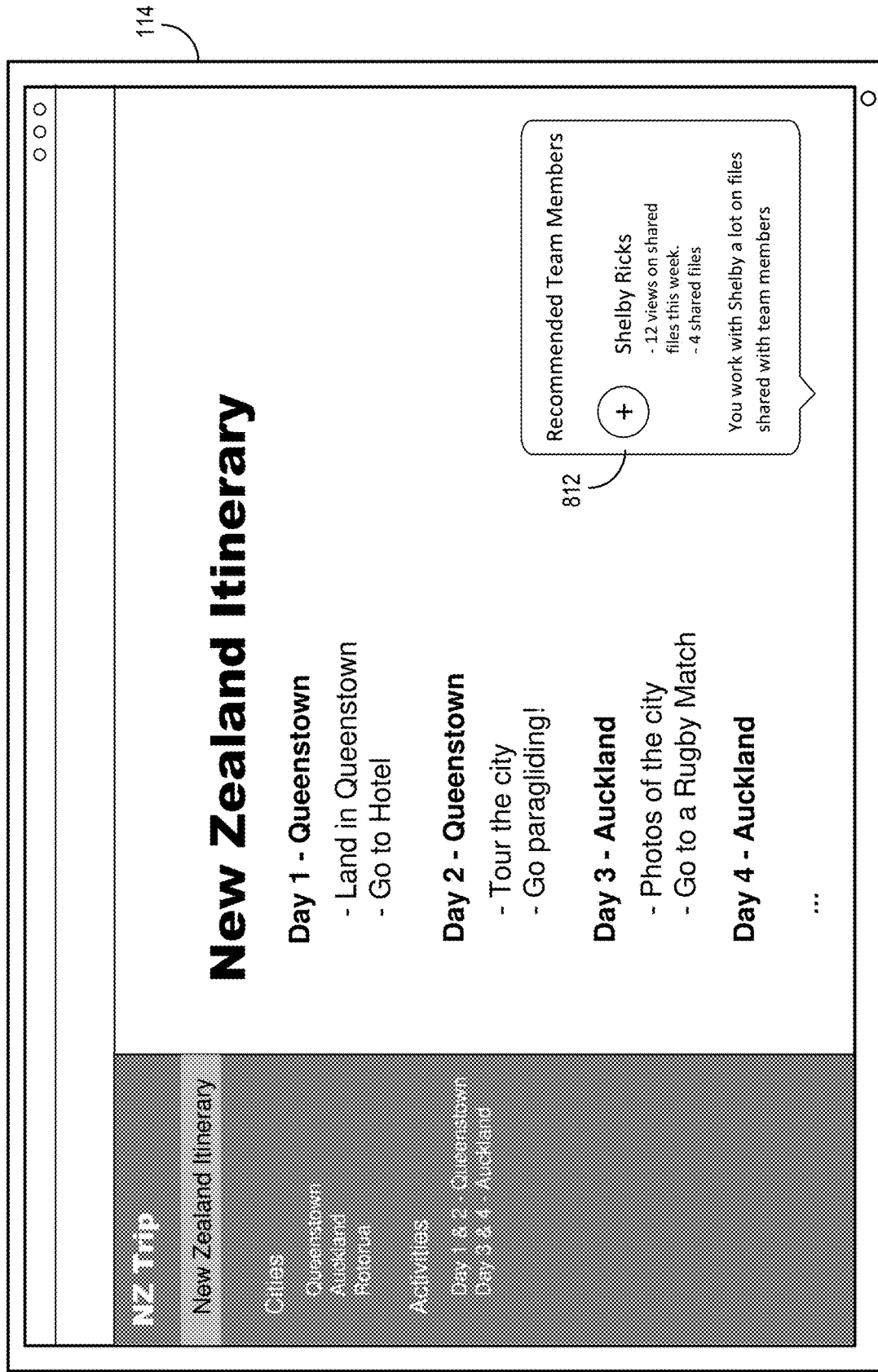

As mentioned, in certain embodiments, the team member recommendation system 102 generates and provides a team member recommendation interface for display on the target user client device 114. In particular, the team member recommendation system 102 provides a recommended-team-member notification within a user interface associated with the content management system 106. FIGS. 8A-8C illustrate different recommended-team-member notifications provided in different user interfaces (e.g., different types of a team member recommendation interface) in accordance with one or more embodiments.

As illustrated in FIG. 8A, the target user client device 114 displays a graphical user interface 802 that includes a recommended-team-member notification 804. Additionally, the graphical user interface 802 includes a number of folders containing digital content items associated with a particular target user, "Bob Stevens." As shown, the graphical user interface 802 includes a Music folder that is only accessible by the target user and further includes a Management folder that is accessible by 23 team members of a content-collaboration team. The team member recommendation system 102 generates and provides the recommended-team-member notification 804 based on determining recommendation scores for candidate team members, as described herein.

As further shown in FIG. 8A, the recommended-team-member notification 804 includes multiple recommended team members. Indeed, the recommended-team-member notification 804 includes indications of Shelby Ricks, Monica Hunt, and Tom Higgins as recommended team members for a content-collaboration team of Bob Stevens. Further, the recommended-team-member notification 804 includes selectable options (e.g., the circled "+" signs) for providing invitations to the respective recommended team members. In some embodiments, the team member recommendation system 102 includes all recommended team members within the single recommended-team-member notification 804 (e.g., all recommended team members whose recommendation scores satisfy a recommendation-score threshold). In other embodiments, the team member recommendation system 102 includes a number of top-ranked recommended team members (e.g., in order of ranking) based on their recommendation scores.

In response to user interaction via the target user client device 114 to select one or more of the selectable options within the recommended-team-member notification 804, the team member recommendation system 102 provides an invitation to a corresponding client device. Indeed, the team member recommendation system 102 provides an invitation to join a content-collaboration team of the target user to a client device associated with the recommended user.

As mentioned above, the team member recommendation system 102 can generate and provide recommended-team-member notifications that include different types and/or amounts of information. For example, the team member recommendation system 102 can provide a recommended-team-member notification that indicates only a single recommended team member and/or that includes one or more recommendation rationales. As illustrated in FIG. 8B, the target user client device 114 displays a graphical user interface 806 that includes a recommended-team-member notification 808.

As shown in FIG. 8B, the graphical user interface 806 is a different use interface than that shown in FIG. 8A. Indeed, the team member recommendation system 102 can provide the recommended-team-member notification 808 within the graphical user interface 806 that includes a particular workspace (e.g., for DROPBOX PAPER) associated with a target user. In some embodiments, the graphical user interface 806 can be a collaborative workspace associated with a content-collaboration team.

As shown further shown in FIG. 8B, the recommended-team-member notification 808 includes a single recommended team member along with a selectable option to provide an invitation to join the content-collaboration team. In addition, the recommended-team-member notification 808 includes a recommendation rationale of "You work with Shelby a lot on files shared with team members."

To generate the recommendation rationale, the team member recommendation system 102 determines a reasoning or a rationale for suggesting the recommended team member. For example, the team member recommendation system 102 determines the rationale based on a connection between the target user and the recommended team member, which is determined as described above. In some embodiments, the rationale can indicate a connection level including a chain or link to the target user or the content-collaboration team (e.g., "Shelby works with your teammate Monica a lot."). In some cases, the team member recommendation system 102 determines the rationale based on one or more features associated with the recommended team member, which features are determined as described above. In certain embodiments, the team member recommendation system 102 determines the rationale based on a factor such as a frequency and/or a recency of collaboration on a digital content item associated with the content-collaboration team. In any event, the team member recommendation system 102 can provide the recommendation rationale for display within the recommended-team-member notification 808 on the target user client device 114. In some cases, the team member recommendation system 102 can determine and provide more than one recommendation rationale for display.

As further illustrated in FIG. 8B, in some embodiments, the team member recommendation system 102 displays features or other information supporting or related to the recommendation rationale. For example, the team member recommendation system 102 provides an indication of one or more features associated with the recommended team member (e.g., from the set of features 502) for display within the recommended-team-member notification 808 (or elsewhere). As shown in FIG. 8B, the recommended-team-member notification 808 includes an indication that Shelby Ricks has "12 views on shared files this week" and "4 shared files" as features that contributed to recommending Shelby Ricks as a team member. In some cases, the team member recommendation system 102 provides additional or alternative information within the recommended-team-member notification 808, such as names of which specific team members have collaborated with the recommended team member (Shelby) in the past.

In certain implementations, the team member recommendation system 102 determines which features to indicate within the recommended-team-member notification 808. For example, the team member recommendation system 102 determines one or more features (e.g., from the set of features 502) associated with the recommended team member that contributed most heavily to recommending the recommended team member. Indeed, in some embodiments, the team member recommendation system 102 determines a contribution measure associated with each feature associated with a recommended team member and compares the contribution measure of each feature. Based on the comparison, the team member recommendation system 102 selects a number (e.g., one, two, or five) of top-ranked features to display (e.g., within a recommended-team-member notification). Alternatively, in some implementations, the team member recommendation system 102 compares the contribution measures with a contribution threshold and provides for display those features that satisfy the contribution threshold. By contrast, in some embodiments, the team member recommendation system 102 displays, within the recommended-team-member notification 808, a predetermined or fixed group of features, such as a number of shared files, a number of views, and/or a number of team members who have collaborated with the recommended team member.

In some embodiments, the team member recommendation system 102 provides a recommended-team-member notification in yet a different type of graphical user interface. For example, the team member recommendation system 102 provides a recommended-team-member notification within a graphical user interface for editing or collaborating on a particular digital content item. FIG. 8C illustrates such an interface shown as graphical user interface 810 in accordance with one or more embodiments.

As illustrated in FIG. 8C, the target user client device 114 displays the graphical user interface 810 in the form of a user interface for editing or creating a digital content item. For example, the graphical user interface 810 is a collaborative interface where multiple team members of a content-collaboration team can edit and/or comment on the digital content item "New Zealand Itinerary." Within the graphical user interface 810, the team member recommendation system 102 provides a recommended-team-member notification 812 that indicates a recommended team member, includes a selectable option to provide an invitation to the recommended team member, and/or includes a recommendation rationale.

Figure 9:
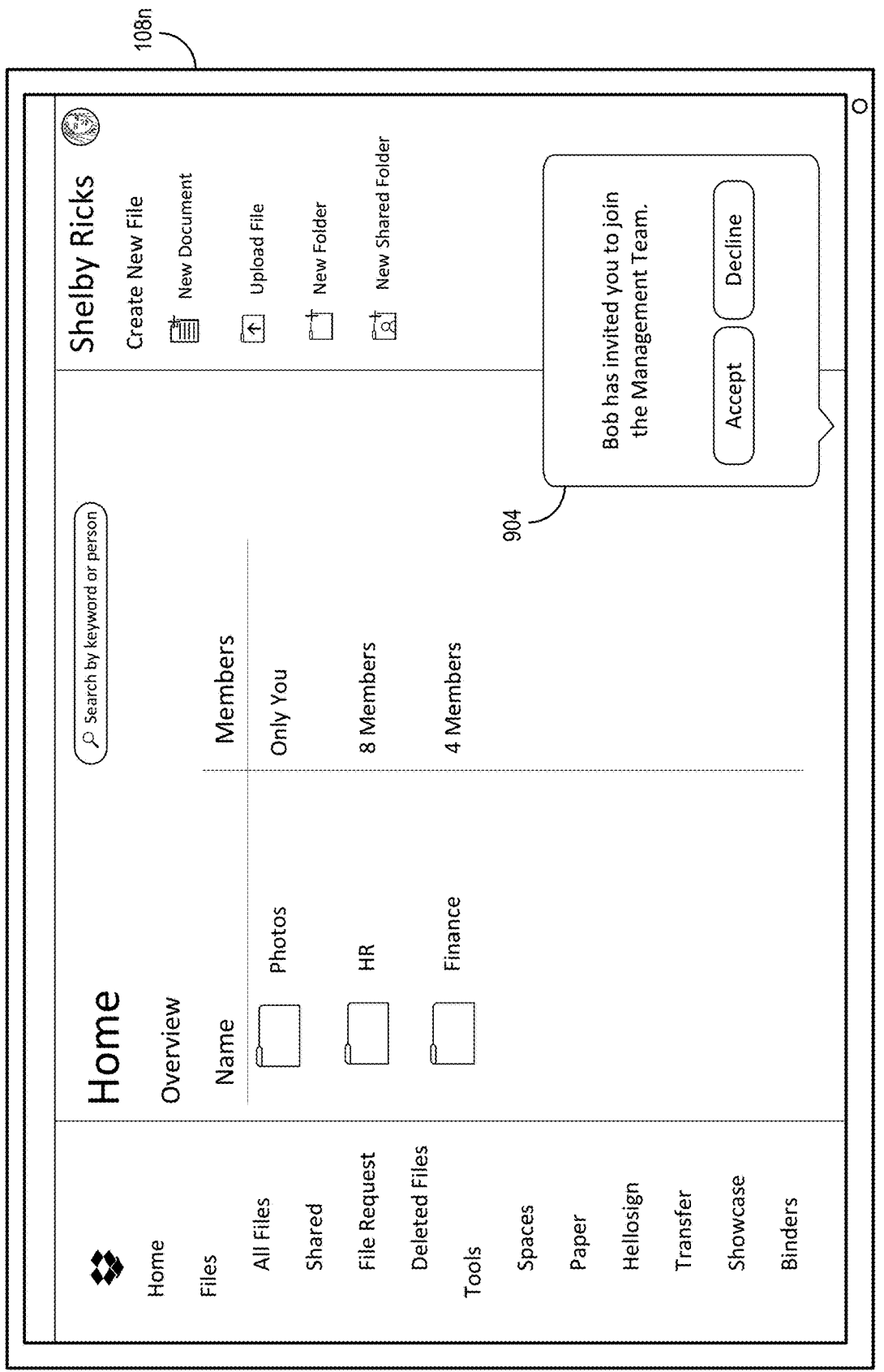
FIG. 9 illustrates an invitation interface displayed on a client device of a recommended team member in accordance with one or more embodiments.

As mentioned above, in certain described embodiments, the team member recommendation system 102 generates and provides an invitation to join a content-collaboration team to a recommended team member. In particular, the team member recommendation system 102 provides an invitation for display on a client device associated with the recommended team member. FIG. 9 illustrates the client device 108*n* displaying a graphical user interface 902 including a content-collaboration team invitation 904 in accordance with one or more embodiments.

As illustrated in FIG. 9, the client device 108*n* (e.g., the client device associated with the recommended team member Shelby Ricks) displays an interface similar to that of the target user client device 114 in FIG. 8A. In addition, the team member recommendation system 102 provides the content-collaboration team invitation 904 for display within the graphical user interface 902. As shown, the content-collaboration team invitation 904 appears as a notification that indicates an explanation of the invitation ("Bob has invited you to join the Management Team") along with selectable options to accept or decline the invitation. As described above, the team member recommendation system 102 provides the content-collaboration team invitation 904 either automatically or in response to target user interaction with a selectable option to provide the invitation. In some cases, the team member recommendation system 102 provides the invitation to join the content-collaboration team in the form of a different communication such as an email or a text message.

Based on user interaction with the selectable options to accept or decline the invitation, the team member recommendation system 102 either adds the recommended team member or refrains from doing so. For example, the team member recommendation system 102 receives an indication of a selection of the accept option, whereupon the team member recommendation system 102 adds the recommended team member (e.g., Shelby Ricks) to the content-collaboration team (e.g., the Management team). Alternatively, the team member recommendation system 102 receives an indication of a selection of the decline option, whereupon the team member recommendation system 102 refrains from adding (or excludes) the recommended team member from the content-collaboration team.

In some embodiments, the team member recommendation system 102 generates and provides an addition-approval notification for display on the target user client device 114. For instance, in cases where the team member recommendation system 102 automatically provides an invitation to a recommended user, and where the recommended user accepts the invitation, the team member recommendation system 102 notifies the target user that the recommended user has accepted an invitation to join a content-collaboration team associated with the target user. In certain embodiments, the team member recommendation system 102 notifies the target user by providing an addition-approval notification for display that includes an approve option and a reject option. In response to a selection of the approve option, the team member recommendation system 102 adds the recommended team member to the content-collaboration team. In response to the reject option, on the other hand, the team member recommendation system 102 excludes the recommended team member from the content-collaboration team.

The components of the team member recommendation system 102 can include software, hardware, or both. For example, the components of the team member recommendation system 102 can include one or more instructions stored on a computer-readable storage medium and executable by processors of one or more computing devices. When executed by one or more processors, the computer-executable instructions of the team member recommendation system 102 can cause a computing device to perform the methods described herein. Alternatively, the components of the team member recommendation system 102 can comprise hardware, such as a special purpose processing device to perform a certain function or group of functions. Additionally or alternatively, the components of the team member recommendation system 102 can include a combination of computer-executable instructions and hardware.

Furthermore, the components of the team member recommendation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the team member recommendation system 102 may be implemented as part of a stand-alone application on a personal computing device or a mobile device.

FIGS. 1-9, the corresponding text, and the examples provide a number of different systems and methods for determining and suggesting recommended team members for a target user via a machine learning approach. In addition to the foregoing, implementations can also be described in terms of flowcharts comprising acts steps in a method for accomplishing a particular result. For example, FIG. 10 illustrates a series of acts 1000 for determining and suggesting recommended team members for a target user via a machine learning approach.

While FIG. 10 illustrates acts according to one implementation, alternative implementations may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further implementations, a system can perform the acts of FIG. 10.

As illustrated in FIG. 10, the series of acts 1000 may include an act 1010 of identifying a set of candidate team members. In particular, the act 1010 can involve identifying, from a plurality of users within a content management system, a set of candidate team members who have access to at least one digital content item in common with a target user within the content management system. For example, the act 1010 involves determining, from the set of candidate team members, a first subset of candidate team members who have previously interacted with the target user within the content management system, and determining, from the set of candidate team members, a second subset of candidate team members who have previously interacted with one or more users that have a connection to the target user within the content management system. In some cases, the act 1010 includes identifying, from the set of candidate team members, a subset of candidate team members having a digital address that belongs to a domain of the content management system common to the target user (e.g., a domain common to the target user within the content management system). The act 1010 can also include determining, from the subset of candidate team members, a group of first-level candidate team members who have previously interacted with the target user within the content management system. Additionally, the act 1010 can include determining, from the subset of candidate team members, a group of second-level candidate team members who have previously interacted with one or more of the first-level candidate team members within the content management system.

As also illustrated in FIG. 10, the series of acts 1000 includes an act 1020 of determining sets of features for candidate team members. In particular, the act 1020 can involve determining sets of features associated with respective candidate team members of the set of candidate team members. For example, the act 1020 involves determining one or more of source features, team features, or candidate-team-member features associated with the respective candidate team members. In some cases, the act 1020 involves determining, for individual candidate team members of the set of candidate team members, respective sets of features comprising one or more of source features, team features, or candidate-team-member features. For example, determining source features includes determining features indicating connections between the individual candidate team members and the target user. Determining team features can include determining features corresponding to a content-collaboration team associated with the target user. Determining candidate-team-member features can include determining features corresponding to the individual candidate team members of the set of candidate team members.

Further, the series of acts 1000 includes an act 1030 of generating one or more recommended team members. In particular, the act 1030 can involve generating, utilizing a team-member-prediction-machine-learning model, one or more recommended team members for the target user based on the sets of features. For example, the act 1030 involves generating, utilizing a team-member-prediction-machine-learning model, recommendation scores for the set of candidate team members based on the respective sets of features. Further, the act 1030 involves selecting one or more recommended team members for the target user based on the recommendation scores.

As further illustrated in FIG. 10, the series of acts 1000 includes an act 1040 of providing a recommended-team-member notification for display. In particular, the act 1040 can involve providing, for display via a client device associated with the target user, a recommended-team-member notification indicating a recommended team member from the one or more recommended team members. For example, the act 1040 involves providing, for display via the client device associated with the target user, a selectable option to send an invitation to join a content-collaboration team to the recommended team member. In some cases, the act 1040 involves providing, for display via a client device associated with the target user, a recommended-team-member notification comprising a selectable option to send an invitation to join a content-collaboration team to a recommended team member from the one or more recommended team members.

In some cases, the series of acts 1000 also includes an act of providing, in response to an indication of user selection of the selectable option, an invitation to join the content-collaboration team to an additional device associated with the recommended team member. Additionally, the series of acts 1000 includes an act of receiving, from the additional client device associated with the recommended team member, an indication of the recommended team member accepting the invitation to join the content-collaboration team. In some embodiments, the series of acts includes an act of receiving, from the client device associated with the target user, an indication of user selection of the selectable option to send the invitation to join the content-collaboration team. Further, the series of acts 1000 includes an act of, based on the indication of accepting the invitation, adding the recommended team member to the content-collaboration team.

In certain embodiments, the series of acts 1000 includes an act of determining recommendation scores for the set of candidate team members utilizing the team-member-prediction-machine-learning model based on the sets of features. Additionally, the series of acts 1000 includes an act of automatically providing, to a second recommended team member from the one or more recommended team members within the content management system, an invitation to join a content-collaboration team based on the recommendation scores. Further, the series of acts 1000 includes an act of providing, for display together with or as part of the recommended-team-member notification, a rationale for suggesting the recommended team member as a team member of a content-collaboration team.

In one or more implementations, the series of acts 1000 includes an act of identifying an invitation to join a content-collaboration team within the content management system. For instance, the series of acts 1000 includes an act of determining that the recommended team member was provided or not provided an invitation to join a content-collaboration team within the content management system. In addition, the series of acts 1000 includes acts of determining (for a time period leading up to when the invitation was provided) updated sets of features associated with respective candidate team members of the set of candidate team members and updating parameters of the team-member-prediction-machine-learning model based on the recommended team member being provided or not provided the invitation and the updated sets of features.

In certain embodiments, the series of acts 1000 includes acts of comparing the recommendations scores with a recommendation-score threshold and selecting the one or more recommended team members for the target user by identifying recommended team members with recommendation scores that satisfy the recommendation-score threshold. In addition, the series of acts 1000 includes an act of determining that a (second) recommendation score associated with the recommended team member (or a second recommended team member) does not satisfy an automatic-invitation-score threshold. In some cases, the series of acts 1000 further includes an act of, based on determining that the (second) recommendation score does not satisfy the automatic-invitation-score threshold, providing, for display as part of the recommended-team-member notification, a selectable option to send an invitation to join a content-collaboration team to the recommended team member (or the second recommended team member).

In one or more embodiments, the series of acts 1000 includes an act of determining that a recommendation score associated with the recommended team member satisfies an automatic-invitation-score threshold. In these or other embodiments, the series of acts 1000 includes an act of automatically providing, based on determining that the recommendation score satisfies the automatic-invitation-score threshold, an invitation to join the content-collaboration team to the recommended team member. The series of acts 1000 can further include an act of determining a connection between the target user and the recommended team member within the content management system. Additionally, the series of acts 1000 can include an act of providing, for display together with or as part of the recommended-team-member notification, a rationale indicating the connection between the target user and the recommended team member.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
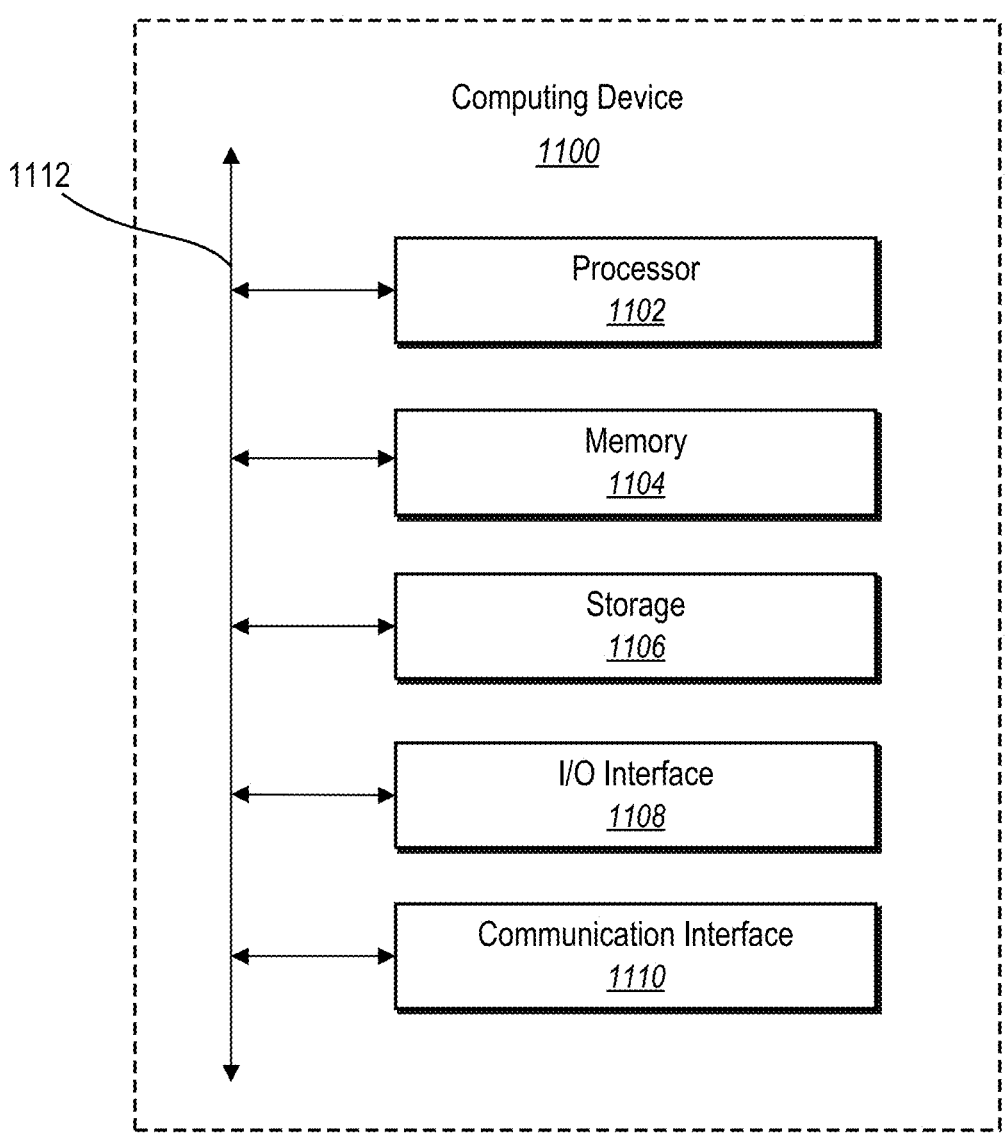
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that server(s) 104, the target user client device 114, and/or the client devices 108a-108n may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
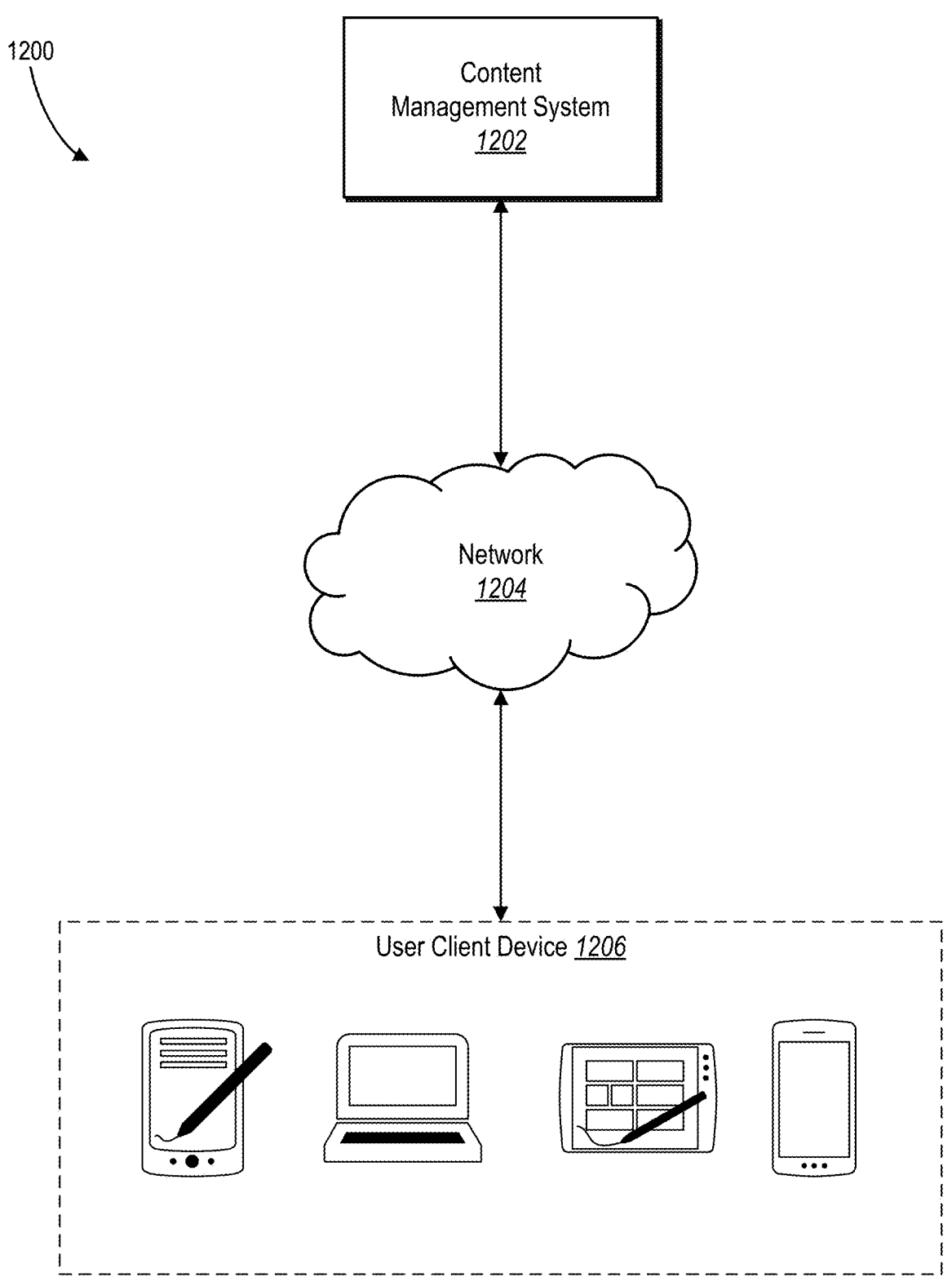
FIG. 12 illustrates an example environment of a networking system having the team member recommendation system in accordance with one or more embodiments.

FIG. 12 is a schematic diagram illustrating environment 1200 within which one or more implementations of the team member recommendation system 102 can be implemented. For example, the team member recommendation system 102 may be part of a content management system 1202 (e.g., the content management system 106). Content management system 1202 may generate, store, manage, receive, and send digital content (such as digital content items). For example, content management system 1202 may send and receive digital content to and from client devices 1206 by way of network 1204. In particular, content management system 1202 can store and manage a collection of digital content. Content management system 1202 can manage the sharing of digital content between computing devices associated with a plurality of users. For instance, content management system 1202 can facilitate a user sharing a digital content with another user of content management system 1202.

In particular, content management system 1202 can manage synchronizing digital content across multiple client devices 1206 associated with one or more users. For example, a user may edit digital content using client device 1206. The content management system 1202 can cause client device 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from content management system 1202. In particular, upon a user selecting a reduced-sized version of digital content, client device 1206 sends a request to content management system 1202 requesting the digital content associated with the reduced-sized version of the digital content. Content management system 1202 can respond to the request by sending the digital content to client device 1206. Client device 1206, upon receiving the digital content, can then present the digital content to the user. In this way, a user can have access to large collections of digital content while minimizing the amount of resources used on client device 1206.

Client device 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
providing, to a machine learning model, a set of digital features associated with candidate recommendations for a target user account;
generating, utilizing the machine learning model, a suggested recommendation for the target user account based on the set of digital features;
generating a recommendation rationale for the suggested recommendation based on two or more features from the set of digital features, wherein the recommendation rationale comprises a generated text description explaining how respective features of the two or more features contributed to the suggested recommendation; and triggering a client device associated with the target user account to display a recommendation notification comprising the suggested recommendation and the recommendation rationale within a content-management user interface associated with creating or modifying one or more digital content items accessible by the target user account.

2. The computer-implemented method of claim 1, wherein:

the recommendation notification that comprises the suggested recommendation and the recommendation rationale further comprises a selectable option to accept the suggested recommendation; and further comprising performing, in response to an indication of user selection of the selectable option, the suggested recommendation.

3. The computer-implemented method of claim 1, wherein determining the recommendation rationale comprises generating a natural language sentence that references the two or more features from the set of digital features on which the recommendation rationale is based.

4. The computer-implemented method of claim 1, further comprising identifying the two or more features from the set of digital features based on determining the two or more features contributed most heavily to generating the suggested recommendation.

5. The computer-implemented method of claim 1, further comprising providing an indication of the two or more features on which the recommendation rationale is based within the recommendation notification.

6. The computer-implemented method of claim 1, wherein providing the set of digital features associated with the candidate recommendations for the target user account comprises identifying at least one of source features, team features, or candidate-team-member features.

7. The computer-implemented method of claim 1, further comprising:

determining a contribution measure associated with each feature of the set of digital features associated with the candidate recommendations for the target user account;

ranking each feature of the set of digital features based on the contribution measure corresponding with each feature; and identifying the two or more features from the set of digital features from which to determine the recommendation rationale based on the ranking of each feature per the corresponding contribution measure.

8. The computer-implemented method of claim 1, wherein the suggested recommendation is a recommendation to add a user account to a team associated with the target user account.

9. A system comprising:

at least one processor; and a non-transitory computer readable medium comprising instructions that, when executed by the at least one processor, cause the system to:

provide a set of digital features to a machine learning model, the set of digital features associated with a target user account;

generate a suggested recommendation for the target user account by processing the set of digital features with the machine learning model;

generate a recommendation rationale for the suggested recommendation based on two or more features from the set of digital features, wherein the recommendation rationale comprises a generated text description explaining how respective features of the two or more features contributed to the suggested recommendation; and trigger a client device associated with the target user account to display a recommendation notification comprising the suggested recommendation and the recommendation rationale within a content-management user interface associated with creating or modifying one or more digital content items accessible by the target user account.

10. The system of claim 9, further comprising instructions that, when executed by the at least one processor, cause the system to perform the suggested recommendation in response to an indication of a user selection of a selectable option provided within the recommendation notification.

11. The system of claim 9, wherein determining the recommendation rationale comprises generating a natural language sentence based on the two or more features on which the recommendation rationale is based.

12. The system of claim 9, further comprising instructions that, when executed by the at least one processor, cause the system to provide, within the recommendation notification, an indication of the two or more features on which the recommendation rationale is based.

13. The system of claim 9, further comprising instructions that, when executed by the at least one processor, cause the system to:

determine a contribution measure associated with each feature of the set of digital features; and identify the two or more features based on the contribution measure associated with each feature of the set of digital features.

14. The system of claim 13, wherein identifying the two or more features based on the contribution measure associated with each feature of the set of digital features comprises:

determining a ranking of each feature of the set of digital features based on the contribution measure corresponding with each feature of the set of digital features; and identifying the two or more features from the set of digital features based on the ranking of each feature of the set of digital features.

15. The system of claim 9, wherein:

the suggested recommendation is a recommendation to add a user account to a team associated with the target user account; and the recommendation rationale indicates a reason the user account should be added to the team associated with the target user account.

16. A non-transitory computer readable medium comprising instructions that, when executed by at least one processor, cause a computing device to:

provide a set of digital features to a machine learning model, the set of digital features associated with a target user account;

generate a suggested recommendation for the target user account by processing the set of digital features with the machine learning model;

generate a recommendation rationale for the suggested recommendation based on two or more features from the set of digital features, wherein the recommendation rationale comprises a generated text description explaining how respective features of the two or more features contributed to the suggested recommendation; and trigger a client device associated with the target user account to display a recommendation notification comprising the suggested recommendation and the recommendation rationale within a content-management user interface associated with creating or modifying one or more digital content items accessible by the target user account.

17. The non-transitory computer readable medium of claim 16, further comprising instructions that, when executed by the at least one processor, cause the computing device to:

generate the generated text description to include an indication of a number of common digital content items that both the target user account and the suggested recommendation have collaborated on.

18. The non-transitory computer readable medium of claim 16, further comprising instructions that, when executed by the at least one processor, cause the computing device to perform the suggested recommendation in response to an indication of a user selection of a selectable option provided within the recommendation notification.

19. The non-transitory computer readable medium of claim 16, further comprising instructions that, when executed by the at least one processor, cause the computing device to:

generate the generated text description to include an indication of a frequency of collaboration between the target user account and the suggested recommendation on a digital content item.

20. The non-transitory computer readable medium of claim 16, wherein the suggested recommendation is a recommendation to add a user account to a team associated with the target user account.

\* \* \* \* \*